United States Patent
Hisatsugu

(10) Patent No.: US 8,396,626 B2
(45) Date of Patent: Mar. 12, 2013

(54) VEHICULAR MANIPULATION INPUT APPARATUS

(75) Inventor: Shinsuke Hisatsugu, Kariya (JP)

(73) Assignee: Denso Corporation, Kariya (JP)

( * ) Notice: Subject to any disclaimer, the term of this patent is extended or adjusted under 35 U.S.C. 154(b) by 230 days.

(21) Appl. No.: 12/928,664

(22) Filed: Dec. 16, 2010

(65) Prior Publication Data

US 2011/0167947 A1 Jul. 14, 2011

(30) Foreign Application Priority Data

Jan. 14, 2010 (JP) ..................... 2010-6146

(51) Int. Cl.
*G06F 7/00* (2006.01)
(52) U.S. Cl. ............... 701/36; 701/31.4; 340/995.27
(58) Field of Classification Search ............ 701/36, 701/49, 31.4, 456; 715/781, 802; 345/173; 74/491; 340/995.27
See application file for complete search history.

(56) References Cited

FOREIGN PATENT DOCUMENTS

| JP | 8-127267 | 5/1996 |
|---|---|---|
| JP | 10-274541 | 10/1998 |
| JP | 2004-185205 | 7/2004 |
| JP | 2004-224149 | 8/2004 |
| JP | 2004-262406 | 9/2004 |
| JP | 2010-64673 | 3/2010 |

OTHER PUBLICATIONS

Office action dated Jan. 25, 2012 in corresponding Japanese application No. 2010-006146.

*Primary Examiner* — Gertrude Arthur Jeanglaude

(74) *Attorney, Agent, or Firm* — Harness, Dickey & Pierce, PLC

(57) ABSTRACT

A vehicular manipulation input apparatus includes, as a pair arranged at different positions, a first manipulation section to execute a first control and a second manipulation section to execute a second control, the second control including a denial of the first control such as suspension, release, nullification, regress, or replacement of the first control with a previous control prior to the first control. A second manipulation direction of second manipulation section is orthogonal to a first manipulation direction of the first manipulation section; alternatively, the second manipulation direction has a directional component opposite the first manipulation direction of the first manipulation section.

17 Claims, 13 Drawing Sheets

PUSH SW

SCROLL WHEEL

TRACK BALL

TOUCH PAD

PRESS MANI

SLIDE MANI

VEHICULAR MANIPULATION INPUT APPARATUS

CROSS REFERENCE TO RELATED APPLICATION

The present application is based on and incorporates herein by reference Japanese Patent Application No. 2010-6146 filed on Jan. 14, 2010.

FIELD OF THE INVENTION

The present invention relates to a vehicular manipulation input apparatus.

BACKGROUND OF THE INVENTION

[Patent document 1] JP-2004-224149 A

There is conventionally designed a vehicular manipulation input apparatus provided with both of a first manipulation to execute a first control and a second manipulation to execute a second control which negates the first control, such as suspension, release, nullification, regress, or replacement of the first control with a previous control prior to the first control. For example, Patent document 1 describes a manipulation panel which contains the various manipulation sections of an air-conditioner. One of the manipulation sections is designed such that a first control is started by executing a manipulation for the first time and canceled by executing the same manipulation for the second time.

It is noted that in cases that a single manipulation section executes a control switchover between a first control and a second control that includes a negation or denial of the first control, a user is sometimes confused which control is intended by himself or herself. Such a confusion or problem may be solved by providing two different manipulation sections executing two controls, respectively. In contrast, in such a case, it becomes necessary to distinguish visually which manipulation section should be manipulated. This produces a possibility of manipulating incorrectly a manipulation section which is not intended to manipulate, thereby not meeting with a touch manipulating manner without need to see. In order to prevent such an incorrect manipulation, there may be a case that a manipulation section is assigned with a manipulation requiring a greater manipulation load (twice manipulations or a great reaction force). This results in aggravation of manipulability, thereby increasing a user's burden, which should be avoided.

SUMMARY OF THE INVENTION

It is an object to provide a vehicular manipulation input apparatus to help prevent an execution of an unintended manipulation of either a first manipulation to execute a first control or a second manipulation to execute a second control that includes a negation of the first control.

To achieve the above object, according to an example of the present invention, a vehicular manipulation input apparatus in a vehicle is provided as follows. A first manipulation section is configured to execute a first control, the first manipulation section having a first manipulation direction. A second manipulation section is configured to execute a second control that is made to include a denial of the first control, the second manipulation section having a second manipulation direction. Herein, the first manipulation section and the second manipulation section are arranged (i) such that the second manipulation direction of the second manipulation section is orthogonal to the first manipulation direction of the first manipulation section, or (ii) such that the second manipulation direction of the second manipulation section has a directional component, which is opposite the first manipulation direction of the first manipulation section.

According to the above configuration, the manipulation directions of the first manipulation section and the second manipulation section differ from each other. This can reduce a possibility of manipulating incorrectly an unintended manipulation section.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereinafter, a vehicular manipulation input apparatus according to an embodiment of the present invention is described with reference to the drawings.

Figure 1:
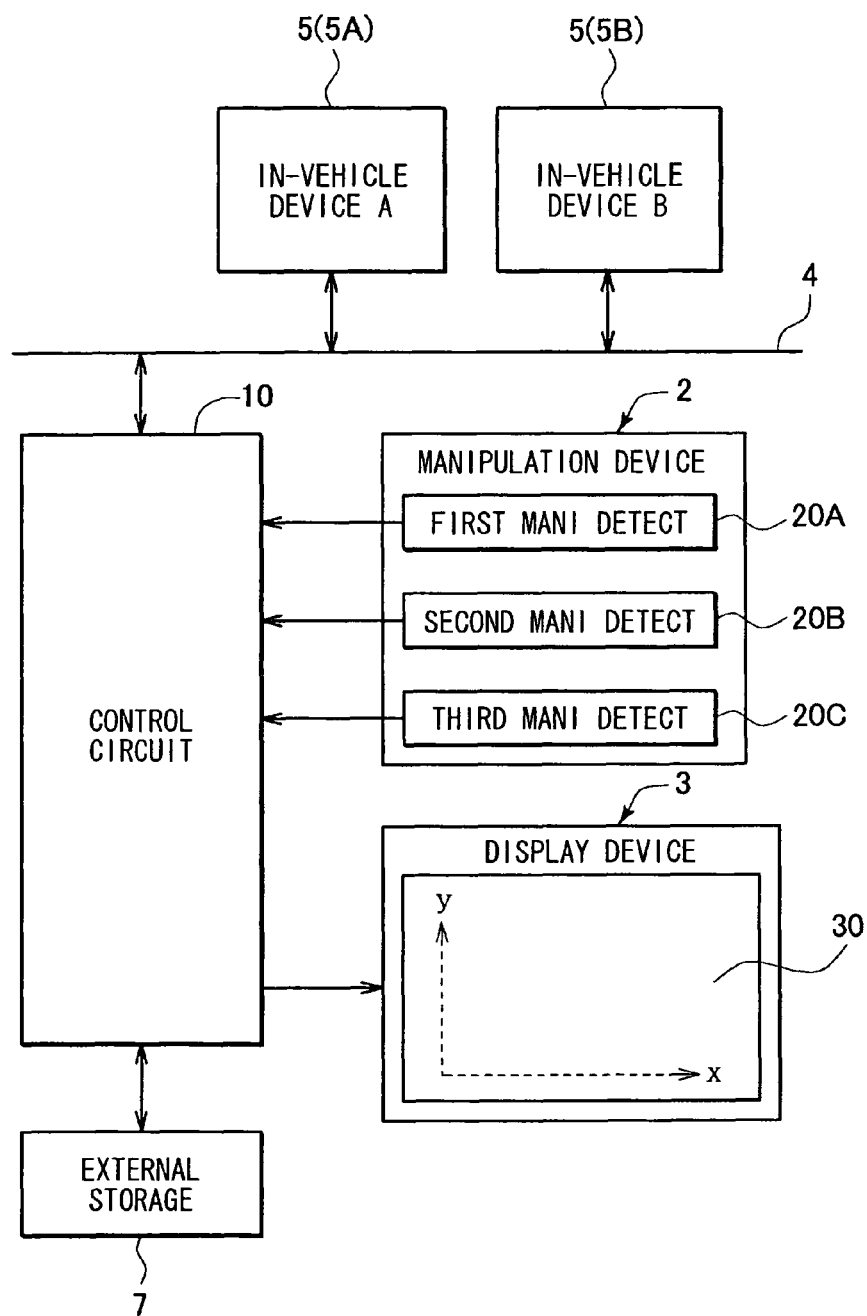
FIG. 1 is a block diagram illustrating a configuration of a vehicular manipulation input apparatus according to embodiments of the present invention.

FIG. 1 is a block diagram illustrating a schematic configuration of a vehicular manipulation input apparatus according to an embodiment of the present invention. With reference to FIG. 1, the vehicular manipulation input apparatus 1 includes a manipulation device 2, a display device 3, and a control circuit 10, which is connected with the devices 2, 3, respectively.

The display device 3 can use a well-known liquid crystal display, for instance. Based on display information (display control signal) outputted from the control circuit 10, the display device 3 displays a display window on a display screen 30. The display device 3 has, on the screen 30, display coordinates of an x axis and a y axis, two of which are mutually orthogonal. On the display coordinates, several selection regions for inputs are arranged to illustrate button images (i.e., input images) on the display screen 30.

The manipulation device 2 includes a pair of a first manipulation section 2A and a second manipulation section 2B. The first manipulation section 2A is to execute a predetermined first control; the second manipulation device 2B is to execute a predetermined second control, which is made in a manner to include a denial of the first control. The first manipulation section 2A and the second manipulation section 2B are arranged in two positions different from each other. The manipulation information based on manipulations of the first manipulation section 2A and second manipulation section 2B is inputted into the control circuit 10. The control circuit 10 executes a corresponding control based on the inputted manipulation information (control input signal). The first manipulation section 2A is used for executing a determination input for executing the first control, for instance, an enter manipulation section enabling an enter manipulation. In contrast, the second manipulation section 2B is used for executing the second control. The second control includes the following: a control for denying an execution of the first control, a control for suspending, releasing, and nullifying the first control under execution; a control for returning the control state to the state before the execution of the first control; and a control for reversing or moving backward the first control. For instance, the second manipulation section serves as a cancel manipulation section. In the present embodiment, in particular, the second manipulation section 2B undergoes an input manipulation to thereby negate the execution of the first control and, at the same time, execute another control.

Figure 2:
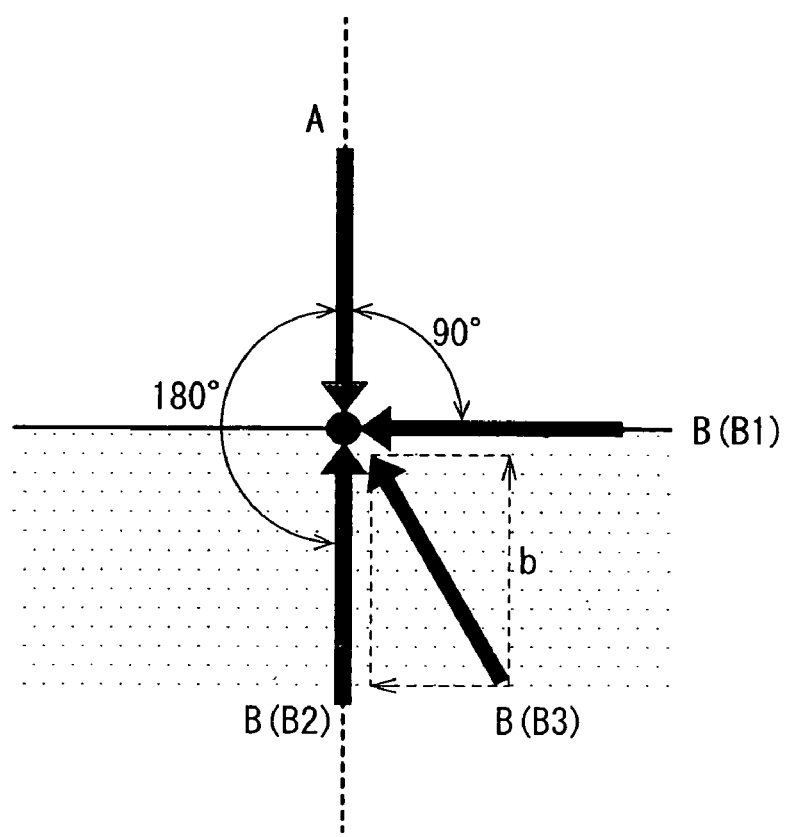
FIG. 2 is a diagram for explaining a relation between a first manipulation direction of a first manipulation section and a second manipulation direction of a second manipulation section.
Figure 3A:
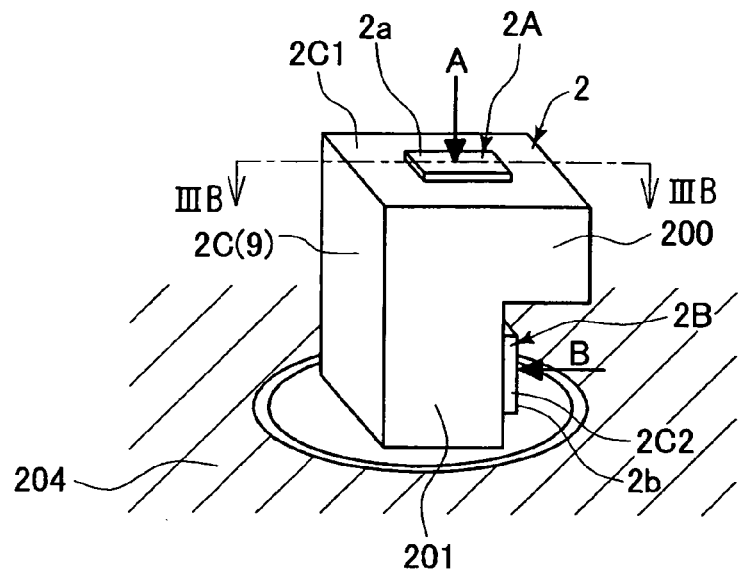
FIG. 3A is an external view for illustrating a manipulation device of a first embodiment of the present invention.
Figure 3B:
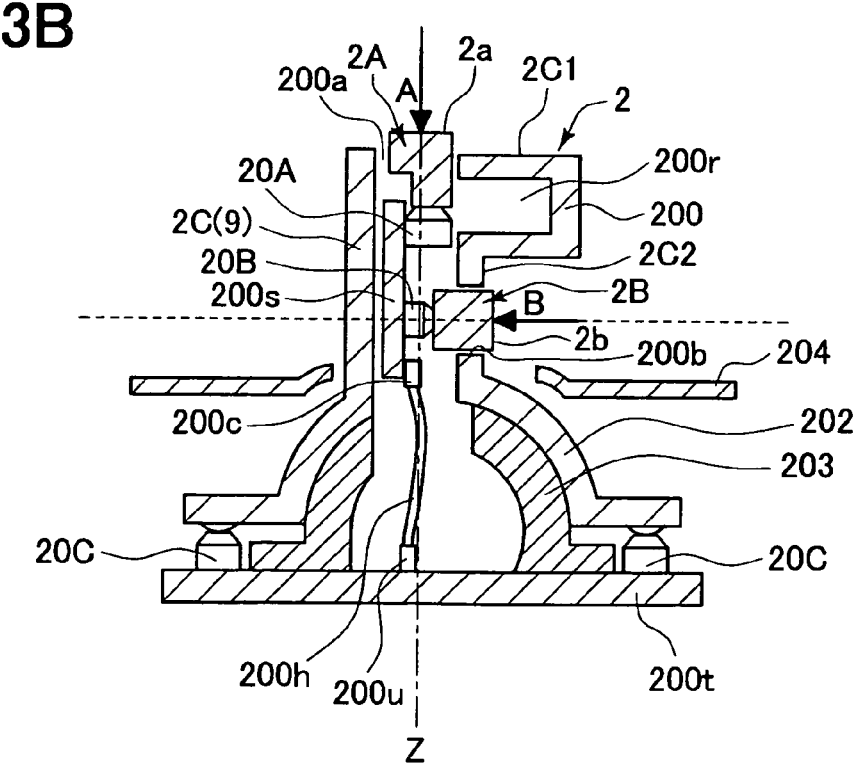
FIG. 3B is a cross-sectional view taken in a line IIIB-IIIB of FIG. 3A.

FIG. 3A illustrates an external view of the manipulation device 2. FIG. 3B illustrates a cross-sectional view taken in a line of IIIB-IIIB in FIG. 3A. The manipulation device 2 is provided with the first and second manipulation sections 2A, 2B such that the manipulation direction B of the second manipulation section 2B is orthogonal to the manipulation direction A of the first manipulation section 2A, or opposite to (i.e., has an opposite directional component) the manipulation direction A of the first manipulation section 2A. For example, with reference to FIG. 2, the manipulation direction B (B1) of the second manipulation section 2B is perpendicular to the manipulation direction A of the first manipulation section 2A; and the manipulation direction B (B2) is opposite the manipulation direction A of the first manipulation section 2A. Furthermore, the manipulation direction B (B3) includes a perpendicular vector component b1 and an opposite vector component b2 with respect to the manipulation direction A of the first manipulation section 2A. The first manipulation section 2A and second manipulation section 2B are provided at the different positions, respectively; this can reduce a possibility of manipulating incorrectly an unintended manipulation section. The manipulation direction A of the first manipulation section 2A and the manipulation direction B of the second manipulation section 2B differ from each other; this can eliminate a possibility of manipulating incorrectly an unintended manipulation section.

Furthermore, the manipulation device 2 has a featured configuration in respect of not only the manipulation directions A and B but also the following arrangement of the first and second manipulation sections 2A, 2B. In such a featured arrangement, a second normal line or perpendicular line is defined as being a second directional extension line extending from a part of a manipulation face 2b (e.g., a central part or a gravity center), which the user touches in order to manipulate the second manipulation section 2B, to the manipulation direction B of the second manipulation section 2B; a first normal line or perpendicular line is defined as being a first directional extension line extending from a part of a manipulation face 2a (e.g., a central part or a gravity center), which the user touches in order to manipulate the first manipulation section 2A, to the manipulation direction A of the first manipulation section 2A. The first normal line and the second normal line are orthogonal to each other. Alternatively, the two normal lines have direction or vector components different from each other in respect of the extending directions to thereby cross each other. Such a configuration can eliminate much certainly a possibility of manipulating incorrectly an unintended manipulation section.

With reference to FIG. 1, the manipulation device 2 includes a first manipulation detection section 20A that detects a manipulation input to the first manipulation section 2A, and a second manipulation detection section 20B that detects a manipulation input to the second manipulation section 2B, independently. The manipulation detection sections 20A and 20B are connected with the control circuit 10. In addition, the manipulation device 2 further includes a third manipulation section 2C in addition to the first and second manipulation sections 2A, 2B; the third manipulation section 2C is designed to be manipulated independently of the first and second manipulation sections 2A, and 2B. A manipulation input to the third manipulation section 2C is detected by a third manipulation detection section 20C, which is connected to the control circuit 10. The detection information which these manipulation detection sections 20A, 20B, and 20C detect is inputted into the control circuit 10 as manipulation information. The manipulation detection sections 20A, 20B, and 20C can adopt well-known components such as a rubber contact, a metal contact, a tact switch, an optical sensor, a magnetic sensor, a pressure-sensitive sensor, and an electrostatic sensor.

In the present embodiment, with reference to FIG. 3A, the third manipulation section 2C is provided to be a pointing device (indication position movement manipulation means or section) which moves an indication position P designated on the display screen 30 according to an amount of a manipulation applied to the third manipulation section 2C. The first manipulation section 2A and second manipulation section 2B are disposed as press manipulation sections (push switches) at positions on the surface of the third manipulation section 2C. In detail, a manipulation face 2a of the first Manipulation section 2A is arranged to be exposed in a position on the upper face 201 of the third manipulation section 2C. Further, a manipulation face 2b of the second manipulation section 2B is arranged to be exposed in a position on a side face 2C2 (e.g., the side face opposing the vehicle's right side) of the third manipulation section 2C. The perpendicular lines extending from the gravity centers centering on the manipulation faces 2a, 2b towards the mutually different manipulation directions are orthogonal to each other.

In addition, the third manipulation section 2C, in the present embodiment is designed to serve as a manipulation body section of the manipulation device 2, and constructed as a joy stick type manipulation section. The third stick-shaped manipulation section 2C is configured such that a tipping section or side 200 is bent in a shape of an L character and an opposite side is a manipulation shaft section 201 inserted into a casing section 204. The casing section 204 accommodates a sphere section 202 formed in the manipulation shaft section 201. The sphere section 202 is supported slidably by an outer surface of a sphere-shaped receptacle section 203 (i.e., holder) fixed in the casing section 204; thus, the manipulation shaft section 201 is supported slidably in the casing section 204. That is, the third manipulation section 2C has two-dimensional manipulation flexibility, and can move in a predetermined two-dimensional movement range.

The joy stick type manipulation body section 9 (2C) is designed to be manipulated to resist a reaction force against manipulation (returning force) towards the neutral angle position such that the own manipulation shaft line Z is held in a neutral angle position under a non manipulation state and inclines from the neutral angle position to a direction corresponding to the direction to an on-screen position, which is a position on the display screen 30 and should be indicated under a manipulation state in which a manipulation is being executed. The extending direction of the above perpendicular line extending from the manipulation face 2a accords with the direction of the manipulation shaft line Z.

The third manipulation section 2C has a first opening portion 200a and a second opening section 200b. The first opening portion 200a is arranged at a position on the upper face 2C1 of the tipping section 200 to accommodate the first manipulation section 2A. The second opening section 200b is arranged at a position on the side face 2C2 of the manipulation shaft section 201 to accommodate the second manipulation section 2B. The third manipulation section 2C contains a hollow internal space 200r, where the sub substrate 200s is arranged. The manipulation detection sections 20A and 20B are fixed in positions on the front face or rear face of the sub substrate 200s so as to be able to detect manipulations of the first and second manipulation sections 2A, 2B. As explained above, the sub substrate 200s is fixed to the internal wall surface of the vehicle's left side of the third manipulation section 2C. The first manipulation detection section 20A is arranged on the upper side of the front surface of the sub substrate 200s; the second manipulation detection section 20B is arranged on the lower side of the front surface of the sub substrate 200s; and a connector 200c is arranged to be fixed to the sub substrate 200s for externally outputting detection information of the manipulation detection sections 20A, 20B. One end of a harness 200h is connected to the connector 200c; the other end is connected to a connector 200u fixed to a main substrate 200t and the control circuit 10 via the main substrate 200t. The main substrate 200t is arranged such that the front face is perpendicular to the manipulation shaft line Z under the non manipulation state of the manipulation selection 2C. Four sub-sections of the third manipulation detection section 20C are arranged in the four directions of the crisscross centering on the manipulation shaft line Z on the front face and connected with the control circuit 10 via the main substrate 200t. When a swing manipulation (i.e., tilt manipulation) is applied with the two-dimensional manipulation flexibility, the control circuit 10 computes a manipulation direction and manipulation amount of the manipulation based on the detection result of the four detection sub-sections of the third detection section 20C.

The control circuit 10 includes mainly a known microcomputer which has a CPU, a ROM, a RAM, etc. The control circuit 10 executes various controls by the CPU executing programs stored in a storage device such as the ROM, and an external storage device 7. In addition, the control circuit 10 can communicate data with other control circuits in other in-vehicle devices 5 (5A, 5B, . . . ) via an in-vehicle LAN 4. Further, the control circuit 10 can execute device functions of the in-vehicle devices 5, by transmitting a control signal for executing a driving control of a control target of each of the other control circuits.

The control circuit 10 may function as a device control means or section to cause the in-vehicle device connected via the in-vehicle LAN 4 such as a navigation device, an air-conditioning device, and a car audio device, bised on the manipulation information received via the substrate 200t from the manipulation detection sections 20A to 20C of the manipulation device 2. In addition, the control circuit 10 may function as a display control means or section to cause the display screen 30 of the display device 3 to display a corresponding window based on the manipulation information received from the manipulation device 2.

The control circuit 10 of the present embodiment may function as a manipulation direction displaying means or section to cause the display screen 30 of the display device 3 to display a manipulation direction display window 300 illustrating one of or both of the manipulation direction A of the first manipulation section 2A and the manipulation direction B of the second manipulation section 2B in the vehicle compartment. The manipulation direction display window 300 displays one of or both of a first manipulation direction display portion 30A that displays the manipulation direction A of the first manipulation section 2A and a second manipulation direction display portion 30B which displays the manipulation direction B of the second manipulation section 2B (manipulation direction displaying means or section), each of which is displayed as a direction indication image (arrow image etc.) indicating the direction in the vehicle compartment. In detail, the following display windows can be exemplified.

FIG. 4(a) illustrates a manipulation section correspondence images 31A and 31B corresponding to the first and second manipulation sections 2A, 2A, respectively, as the manipulation direction display window 300. The manipulation section correspondence images 31A, 31B are used to illustrate manipulation direction display portions 30A, 30B corresponding to the first and second manipulation sections 2A, 2B, respectively, so as to indicate mutual indication directions being orthogonal to each other. The manipulation direction display portions 30A, 30B indicate the manipulation directions A, B of the corresponding manipulation sections 2A, 2B in the vehicle compartment. Such an indication has a direction to express a center part of each of the manipulation section correspondence images 31A, 31B. In addition, the manipulation correspondence images 31A, 31B include quadrangular main images 31A0, 31B0, and cylinder shaped manipulation face position display images 31A1, 31B1, which are displayed on, of the main images 31A0, 31B0, the sides that adjoin the manipulation faces 2a, 2b of the manipulation sections 2A, 2B, respectively. The manipulation direction display portions 30A, 30B are direction indication images to point out the manipulation face position display images 31A1, 31B1 from an external side to go to center parts of the correspondence main images 31A0, 31B0 of the manipulation section correspondence images 31A, 31B.

Figure 4:
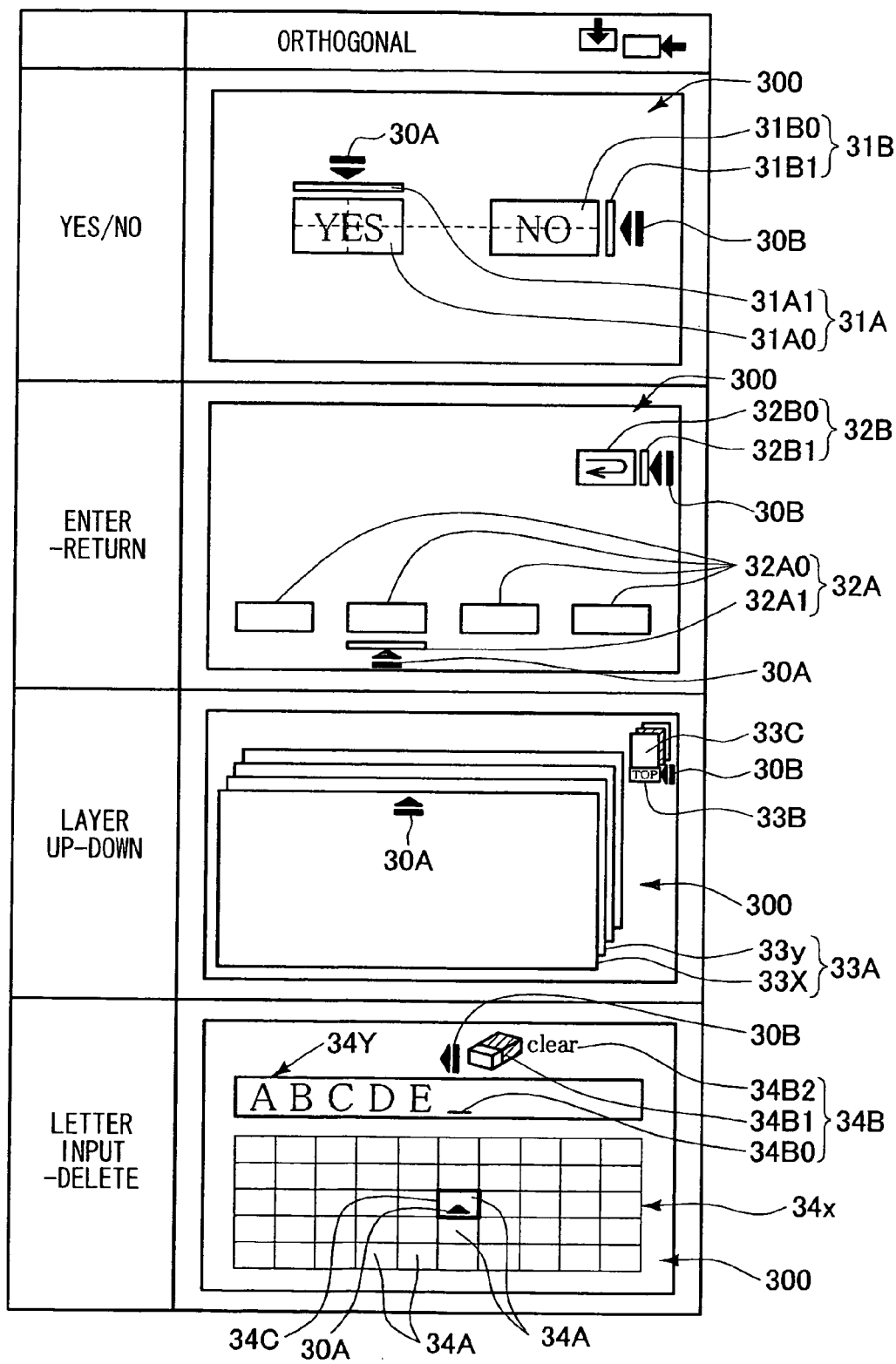
FIG. 4 is a diagram illustrating examples of display windows.

FIG. 4(*b*) displays, as the manipulation direction display window 300, a first input image 32A to execute a first control by receiving a manipulation input using the first manipulation section 2A. FIG. 4(*b*) further displays a first manipulation direction display portion 30A by using the first input image 32A. Furthermore, the manipulation direction display window 300 contains several first input images 32A. Selection manipulation for selecting one of the several first input images 32A is made possible by using the third manipulation section 2C. That is, the control circuit 10 may function as an input image switchover means or section to execute switchover to replace a presently selected input image 32A with a new different input image 32A (e.g., a selectable input image 32A adjoining the presently selected input image 32A), based on the selection manipulation to the third manipulation section 2C. Furthermore, the control circuit 10 may function as a manipulation direction display portion movement means or section to move the display position of the first manipulation direction display portion 30A into the position indicating the input image 32A newly becoming under a selection state, in conjunction with the above switchover. At this time, the first manipulation direction display portion 30A may function as a cursor pointing out the input image 32A under the selection state.

Furthermore, the manipulation direction display window 300 in FIG. 4(*b*) contains a second input image 32B, which executes a second control against the first control made just before based on a manipulation input by using the second manipulation section 2B, in addition to the several first input images 32A. The second manipulation direction display portion 30B has an indication direction which is orthogonal to the indication direction of the first manipulation direction display portion 30A; further, it is displayed by using the second input image 32B.

Similar to the manipulation correspondence images 31A, 31B in FIG. 4(*a*), the input images 32A, 32B in FIG. 4(*b*) contain main images 32A0, 32B0 and manipulation face position display images 32A1, 32B1. The manipulation direction display portions 30A, 30B in FIG. 4(*b*) are illustrated like the manipulation direction display portions 30A, 30B in FIG. 4(*a*). The second manipulation direction display portion 30B may function as a cursor pointing out the input image 32B under the selection state. In addition, at this time, selection of the second input image 32B is designed to be disabled by the selection manipulation using the third manipulation section 2C.

FIG. 4(*c*) displays a first control content image 33A enabling estimation or recognition of a control content of a first control, as a manipulation direction display window 300; at the same time, FIG. 4(*c*) further displays a first manipulation direction display portion 30A by using the first control content image 33A. The above first control is executed by the control circuit 10 and a main display switchover control to switch the main display in the manipulation direction display window 300 from a first display image 33X into a second display image 33Y.

The manipulation direction display window 300 in FIG. 4(*c*) at least contains, as the first control content image 33A corresponding to the main display switchover control, both of the first display image 33X which is displayed as a main display in the manipulation direction display window 300 and the second display image 33y corresponding to the above second display image 33Y (unshown). In contrast, a direction indication image indicating the manipulation direction A of the first manipulation section 2A for executing the main display switchover control is displayed as a manipulation direction display portion 30A corresponding to the main display switchover control, so as to indicate the direction to the image 33y corresponding to the above second display image 33Y from the above first display image 33X.

It is noted that the first control is a switchover control to switch the first display image 33X, which is presently displayed as a main display, to the second display image 33Y which is one-layer lower than the first display image 33X. The first and second display images 33X, 33Y belong to a display image group having multi-layered structure in which display of each display image of the display image group is switchable in a hierarchical order. The first control content image 33A illustrates that the display image 33B exists as a lower layered display image with respect to the first display image 33X presently displayed as a main display; further, it illustrates that the second image 33Y is displayable. The first control content image 33A in FIG. 4(*c*) expresses the image 33y, which corresponds to the second display image 33Y that serves as the lower layered display image, such that the image 33y is disposed behind the first display image 33X that is presently displayed as a main display in the manipulation direction display window 300.

It is noted that the image 33y corresponding to the second display image 33Y does not need to be the second display image 33Y itself; the image 33y only needs to be an image that enables the estimation or recognition that the image 33y is lower than the first display image 33X in the hierarchy. In addition, in FIG. 4(*c*), the main display is defined as a display image having a largest area among other display images included in the display image group.

Furthermore, the manipulation direction display window 300 in FIG. 4(*c*) contains a second control content image 33B and a second manipulation direction display portion 30B. The second control content image 33B allows the estimation or recognition of the control content of the second control executed to include denial of the first control. The, second manipulation direction display portion 30B is displayed in a direction orthogonal to the direction of the first manipulation direction display portion 30A by using the second control content image 33B.

It is noted that the second control is a switchover control to switch the first display image 33X, which is presently displayed as a main display, to a higher layered display image which is positioned in the hierarchy side opposite the lower layered side of the second display image 33Y. The first display image 33X and the higher layered display image belong to a display image group having multi-layered structure in which display of each display image of the display image group is switchable in a hierarchical order. The second control content image 33B illustrates that the display image 33C exists as a higher layered display image with respect to the first display image 33X presently displayed as a main display; further, it illustrates that the second image 33C is displayable. In FIG. 4(*c*), separately from the display in which the image 33y corresponding to the lower layer is located in a row behind the first display image 33X, a second control content image 33B is displayed which illustrates that the uppermost layered display image can be displayed. Furthermore; in FIG. 4(*c*), an auxiliary image 33C is displayed to be close to the second control content image 33B. The auxiliary image 33C illustrates that the first display image 33X presently displayed as a main display is not the uppermost layer. When the first display image 33X presently displayed as the main display is the uppermost layered display image, it can be understood by the auxiliary image. In such a case, however, the second manipulation direction display portion 30B is under a non-display state.

FIG. 4(d) displays in arrangement, as the manipulation direction display window 300, several first input images 34A to execute a first control by receiving a manipulation input using the first manipulation section 2A. FIG. 4(d) further displays a first manipulation direction display portion 30A by using the first input image 34A. Selection manipulation for selecting one of the several input images 34A can be made by the third manipulation section 2C.

The manipulation direction display window 300 in FIG. 4(d) is a letter symbol input window, which contains an input candidate letter symbol portion 34x and an input letter symbol display portion 34Y. The input candidate letter symbol portion 34x arrays several input images 34A which have one-to-one correspondence with various letters and symbols, respectively. The input letter symbol display portion 34Y displays a letter symbol string (i.e., a string of characters and symbols), which are inputted one by one based on the input images 34A. The control circuit 10 may function as an input image switchover means or section to execute switchover to replace a presently selected input image 34A with a new different input image 34A (e.g., a selectable input image 34A adjoining the presently selected input image 34A), based on the selection manipulation to the third manipulation section 2C. Furthermore, the control circuit 10 may function as a manipulation direction display portion movement means or section to move the display position of the first manipulation direction display portion 30A into the position indicating the input image 34A being newly under a selection state, in conjunction with the above switchover. Further, a cursor 34C is also illustrated so as to indicate the input image 34A under a selection state. Furthermore, the control circuit 10 may function as an input acceptance means or section which accepts an input of a letter/symbol corresponding to the input image 34A which has been selected from among the several input images 34A when a manipulation is made using the first manipulation section 2A. The control circuit 10 causes the display device 3 to execute a display as follows. In the input letter symbol string display portion 34Y, an accepted letter/symbol is displayed at a position where a prompt is displayed, so as to follow the already inputted letter symbol string, and the prompt is moved to the right side of the newly displayed letter/symbol.

That is, the first control is a control which receives an input of a letter/symbol corresponding to the input image 34A which is under a selection state. The first input image 34A displays a corresponding letter/symbol and plays a role of a control content image. The first manipulation direction display portion 30A points out a manipulation direction A of the first manipulation section 2A; it is a direction indication image which points out a central part within a single input image 34A included in the input candidate letter symbol portions 34x.

Furthermore, the manipulation direction display window 300 in FIG. 4(d) contains, in addition to several first input images 34A, a second control content image 34B and a second manipulation direction display portion 30B. The second control content image 34B executes a control content image 34B allowing the estimation or recognition of a control content of a second control against the first control executed just before by a manipulation input using the second manipulation section 2B. The second manipulation direction display portion 30B has an indication direction which is orthogonal to the indication direction of the first manipulation direction display portion 30A; further, it is displayed by using the second control content image 34B.

That is, the second control is a control which accepts an elimination of the letter symbol accepted immediately before. The second control content image 34B contains a prompt 34B0, which is displayed in the input letter symbol string display portion 34Y, an image 34B1 (rubber eraser), which is associated with or suggests clearance of the letter/symbol and adjoins the prompt 34B0, and a letter/symbol string 34B2 (character string "clear") which suggests clearance of the letter/symbol and adjoins the prompt 34B0. Further, only one of the image 34B1 and the letter/symbol string 34B2 may be displayed. The second manipulation direction display portion 30B points out a manipulation direction B of the second manipulation section 2B above the prompt 34B0; it is a direction indication image indicating the direction which goes to the just previously accepted letter/symbol from the present position of the prompt 34B0.

The example of the present embodiment is explained in the above; however, such an example is only one example. The present embodiment need not be limited to the above example, and can be varied in various manners based on the knowledge of a person skilled in the art unless deviating from the scope of the claims. The following describes another embodiment.

Under the above embodiment, a second normal line or perpendicular line is defined as being a directional extension line extending from a part of a manipulation face 2b, which the user touches in order to manipulate the second manipulation section 2B, to the manipulation direction B of the second manipulation section 2B; a first normal line or perpendicular line is defined as being a directional extension line extending from a part of a manipulation face 2a, which the user touches in order to manipulate the first manipulation section 2A, to the manipulation direction A of the first manipulation section 2A. The manipulation sections 2A, 2B are provided such that two first and second normal lines cross orthogonally each other; however, they may be provided such that two first and second normal lines are arranged to the mutually opposite directions or, furthermore, are arranged to mutually opposite directions on the identical straight line.

Figure 5A:
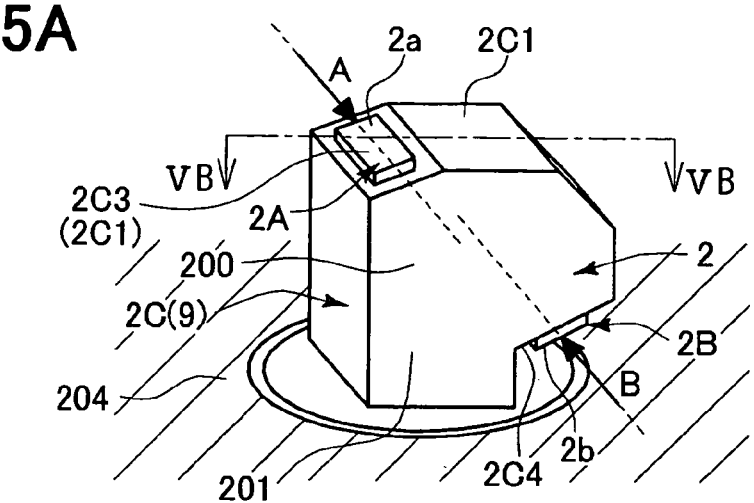
FIG. 5A is an external view for illustrating a manipulation device of a second embodiment of the present invention.
Figure 5B:
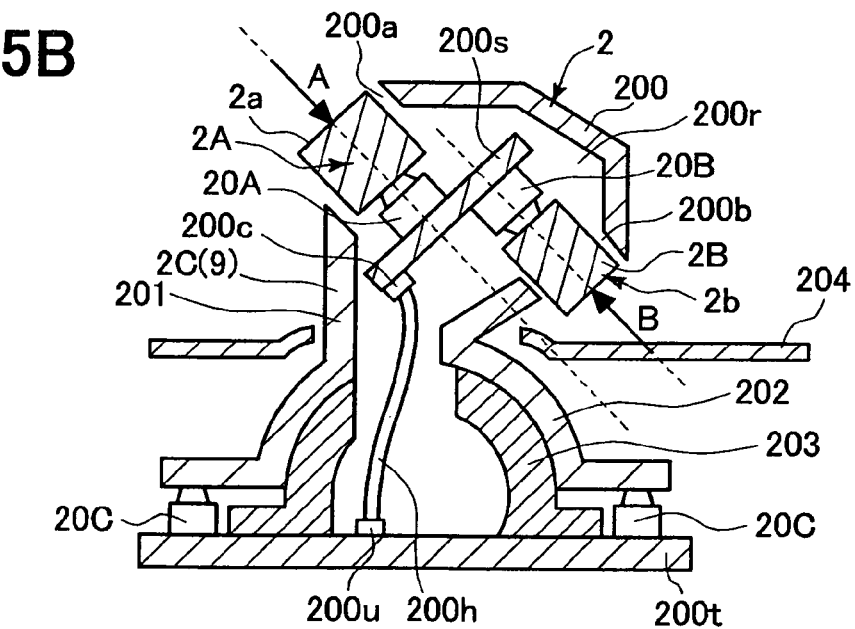
FIG. 5B is a cross-sectional view taken in a line VB-VB of FIG. 5A.
Figure 5C:
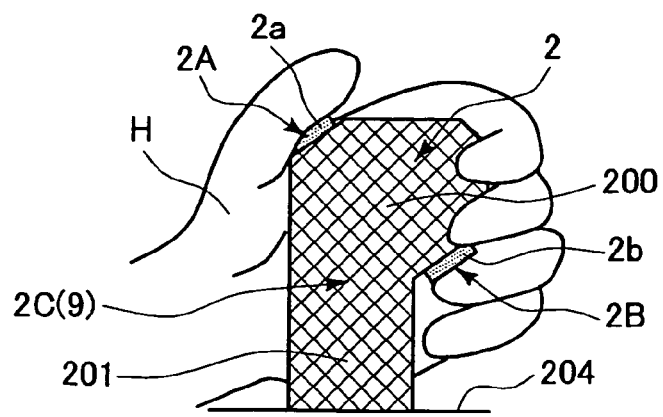
FIG. 5C is a view for illustrating a manipulation manner.

With reference to a manipulation device 2 in FIGS. 5A to 5C, a second perpendicular line is defined as a directional extension line extending from a gravity center in a center part of the manipulation face 2b of a second manipulation section 2B towards a manipulation direction B of the second manipulation section 2B; a first perpendicular line is defined as a directional extension line extending from a gravity center in a center part of the manipulation face 2a of a first manipulation section 2A towards a manipulation direction A of the first manipulation section 2A. The first and the second manipulation sections 2A, 2B are arranged on the joy stick type manipulation body section 2C such that the first and the second perpendicular lines are directed at the different opposite directions, respectively.

FIG. 5A illustrates a schematic external view of the manipulation device 2. FIG. 5B illustrates a schematic cross-sectional view taken in a VB-VB line in FIG. 5A. FIG. 5C illustrates a state in which the manipulation body section 2C is grasped by a hand of a user. The manipulation body section 2C (9) is designed as a stick shaped manipulation section which has a two-dimensional manipulation flexibility similar to that in the above embodiment. A first manipulation section 2A is arranged such that it is easy for a thumb of a hand H, which grasps the manipulation body section 2C (9), to manipulate. The joy stick type manipulation section 2C (9)

has, in the upper face 2C1, a face 2C3, which is a slope face positioned at the side of the wrist of the hand H. The first manipulation section 2A is provided in an opening portion 200*a* in the slope face 2C3. In contrast, a second manipulation section 2B is arranged in the joy stick type manipulation section 2C (9) in a position which opposes the first manipulation section 2A. The manipulation section 2C (9) has a head end that protrudes in a shape of an L character; a lower face 2C4 of the head end has a slope parallel with the slope face 2C3. The second manipulation section 2B is provided in an opening portion 200*b* in the slope face 2C4. The manipulation body section 2C (9) contains a hollow internal space 200*r*, where the sub substrate 200*s* is arranged. The sub substrate 200*s* is arranged such that the front face and rear face are orthogonal to the manipulation directions A, B of the first and second manipulation sections 2A, 2B. The manipulation detection section 20A is fixed on the rear face; the manipulation detection section 20B and the connector 200*c* are fixed on the front face. The other internal structure is the same as that of the manipulation device 2 in FIG. 3.

Figure 6A:
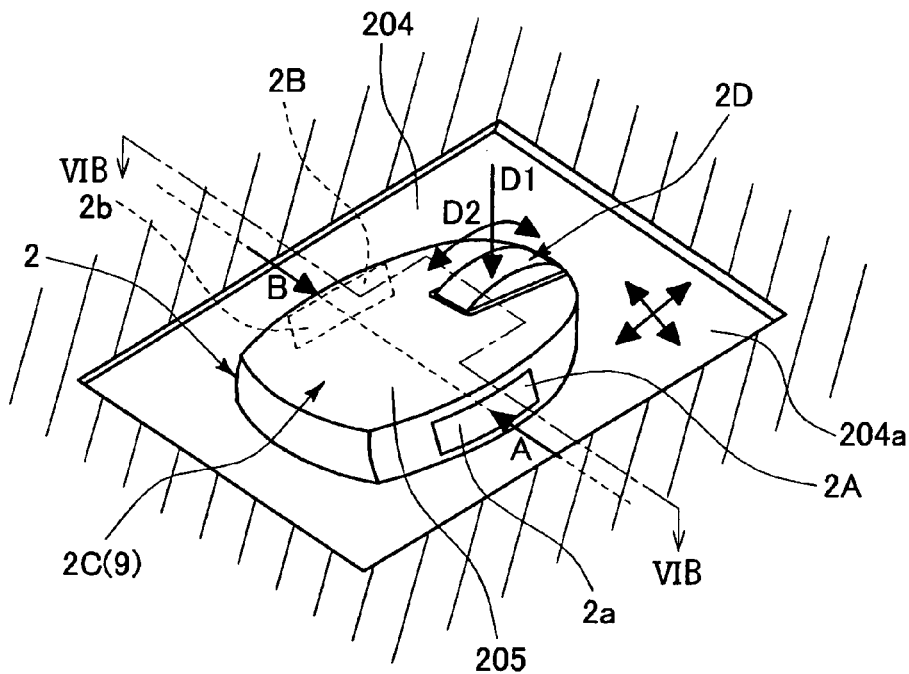
FIG. 6A is an external view for illustrating a manipulation device of a third embodiment of the present invention.
Figure 6B:
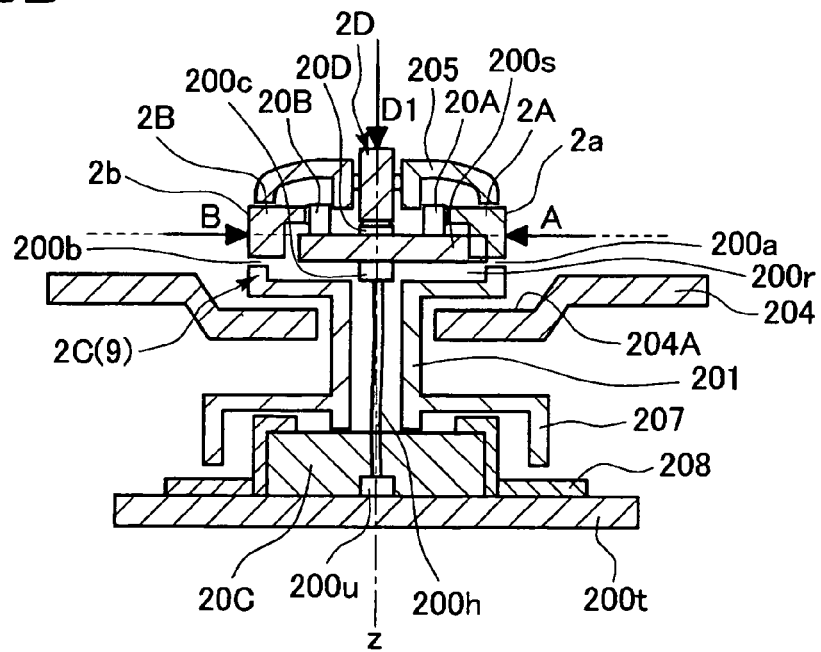
FIG. 6B is a cross-sectional view taken in a line VIB-VIB of FIG. 6A.

With reference to a manipulation device 2 in FIGS. 6A, 6B, a second perpendicular line is defined as a second directional extension line extending from a gravity center in a center part of the manipulation face 2*b* of a second manipulation section 2B towards a manipulation direction B of the second manipulation section 2B; a first perpendicular line is defined as a first directional extension line extending from a gravity center in a center part of the manipulation face 2*a* of a first manipulation section 2A towards a manipulation direction A of the first manipulation section 2A. The first and second manipulation sections 2A, 2B are arranged on a commander type manipulation body section 2C such that the first and the second directional extension lines have directions opposite to each other.

FIG. 6A illustrates an external view of the manipulation device 2. FIG. 6B illustrates a cross-sectional view taken in a line of VIB-VIB in FIG. 6A. The manipulation body section 2C-(9) has a two-dimensional manipulation flexibility similar to that of the above embodiment; it has a commander type manipulation body section 2C (9) which can be moved parallel on a predetermined two-dimensional plane. The first opening portion 200*a* is arranging at a position on one of the right and left sides to accommodate the first manipulation section 2A. The second opening section 200*b* is arranging at a position on the other side to accommodate the second manipulation section 2B. The first and second manipulation section 2A, 2B are symmetrically arranged in the opening portions 200*a*, 200*b*, so as to oppose the respective manipulation directions A, B. In detail, the respective manipulation directions A, B go to an inside of the manipulation body section 2C while being opposite each other. Perpendicular lines (or normal lines) extending from the gravity centers of the manipulation faces 2*a*, 2*b* towards the manipulation directions A, B are overlapped with each other on an identical straight line.

Furthermore, a scroll wheel (rotation manipulation section) is provided as a fourth manipulation section 2D in a front end portion in the longitudinal direction of the manipulation body section 2C so as to enable a scroll manipulation. The scroll wheel 2D is designed to enable not only a rotation manipulation but also a press manipulation to a lower direction. The manipulation body section 2C accommodates a fourth manipulation detection section 20D that detects a presence or absence of a press manipulation.

With respect to the manipulation body section 2C (9), a head end section 205 is located in a concave portion 204A in the manipulation housing (casing section) 204; a manipulation shaft section 201 which extends to a lower side is inserted into the manipulation housing (i.e., casing section) 204. The manipulation housing 204 accommodates a plane sliding section 207 formed in the manipulation shaft section 201. The plane sliding section 207 is supported slidably on a planar upper face of a holder 208 fixed in the manipulation housing 204; thus, the manipulation shaft section 20 is Supported to be movable parallel with respect to the casing section 204. The manipulation body section 2C (9) contains a hollow internal space 200*r*, where the sub substrate 200*s* is arranged. The manipulation detection sections 20A, 20B, and 20D and the connector 200*c* are fixed to the sub substrate 200*s*. One end of a harness 200*h* is connected to a connector 200*c*, and the other end is connected to a connector 200*u* fixed on the main substrate 200*t*. The holder 208 is fixed on the main substrate, 200*t*. A fourth manipulation detection section 20D for detecting a manipulation direction and a manipulation amount of the manipulation body section 2C (9) is fixed inside of the holder 208.

In the embodiment in FIGS. 6A, 6B, the fourth manipulation section 2D can be used as a manipulation section for executing a predetermined first control by the above press manipulation. In such a case, the rotation manipulation direction D2 of the manipulation section 2D is orthogonal to the manipulation direction D1 of the press manipulation; thus, the fourth manipulation section 2D can be a manipulation section to execute the second control, which is made to include a denial of the first control by the rotation manipulation. In addition, the manipulation directions A, B of the first and second manipulation sections 2A, 2B in FIGS. 6A, 6B are orthogonal to the manipulation direction D; thus, one of or both of the first manipulation section 2A and the second manipulation section 2B can be a manipulation section to execute the second control, which is made to include a denial of the first control. On the contrary, one of or both of the first manipulation section 2A and the second manipulation section 2B may be designated as a manipulation section to execute a predetermined first control; the fourth manipulation section 2D may be a manipulation section to execute the second control made to include a denial of the first control by the press manipulation.

Figure 7A:
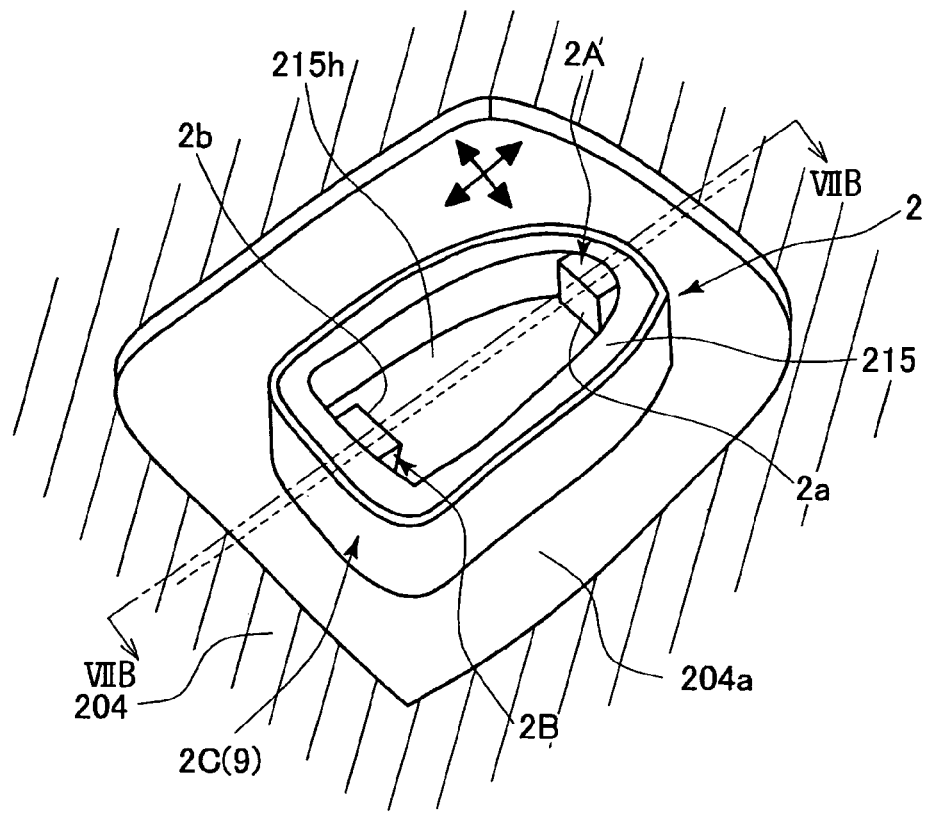
FIG. 7A is an external view for illustrating a manipulation device of a fourth embodiment of the present invention.
Figure 7B:
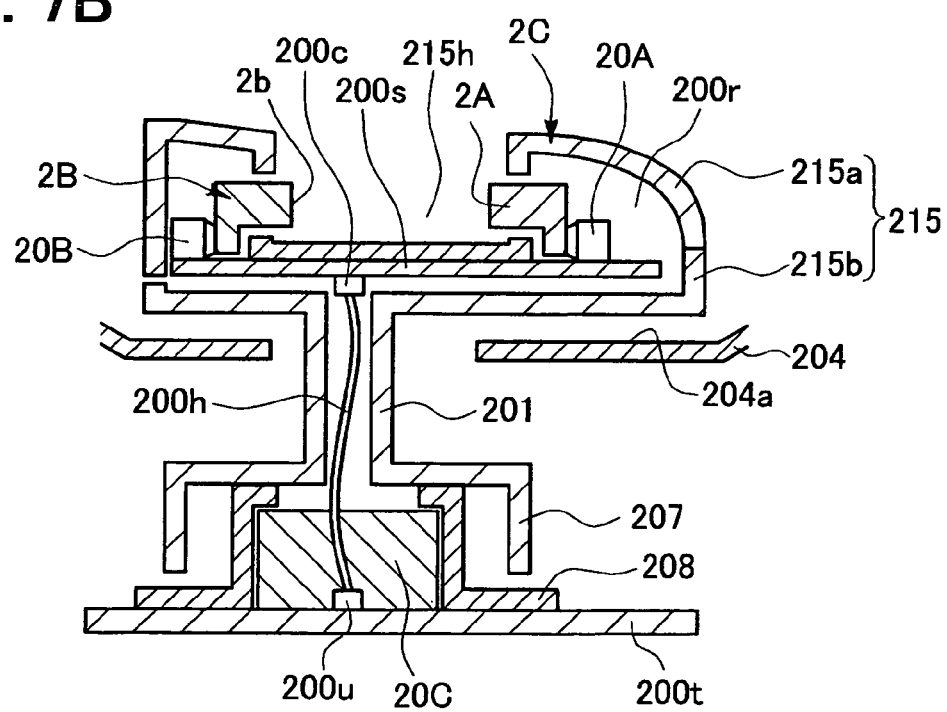
FIG. 7B is a cross-sectional view taken in a line VIIB-VIIB of FIG. 7A.

With reference to a manipulation device 2 in FIG. 7A, 7B providing an embodiment having a commander type manipulation body section 2C similar to that of FIGS. 6A, 6B, manipulation directions of the first and second manipulation sections 2A, 2B provided on the manipulation body section 2C are opposite each other like in the manipulation device 2 in FIGS. 6A, 6B. In contrast, unlike in the manipulation device 2 in FIGS. 6A, 6B, the manipulation directions A, B go to an outside of the manipulation body section 2C. FIG. 7A illustrates an external view of the manipulation device 2. FIG. 7B illustrates a cross-sectional view taken in a line of VIIB-VIIB in FIG. 7A. In such an embodiment, a concave portion 215*h* is formed in a central portion of a manipulation body 215 of the manipulation body section 2C so as to open to an upper direction. A first and second manipulation sections 2A, 2B are arranged, respectively, in inner walls which oppose each other in the longitudinal direction of the manipulation body section 2C of the inner walls of the concave portion 215*h*. The mutual manipulation faces 2*a*, 2*b* of the first and second manipulation sections 2A, 2B face each other in the concave portion 215*h*. In addition, unlike the embodiment in FIGS. 6A, 6B, there is no scroll wheel 2D; however, a scroll wheel can be provided additionally in the embodiment in FIGS. 7A, 7B.

Figure 8A:
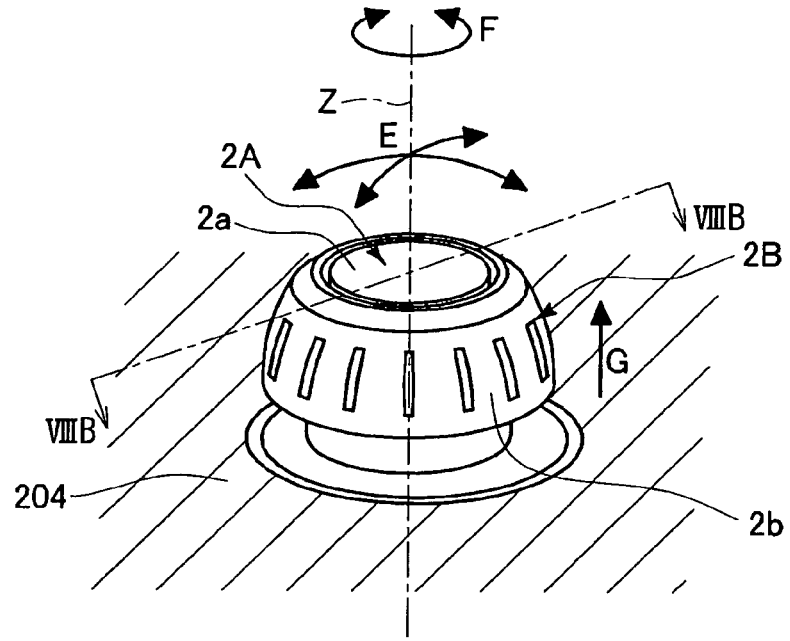
FIG. 8A is an external view for illustrating a manipulation device of a fifth embodiment of the present invention.
Figure 8B:
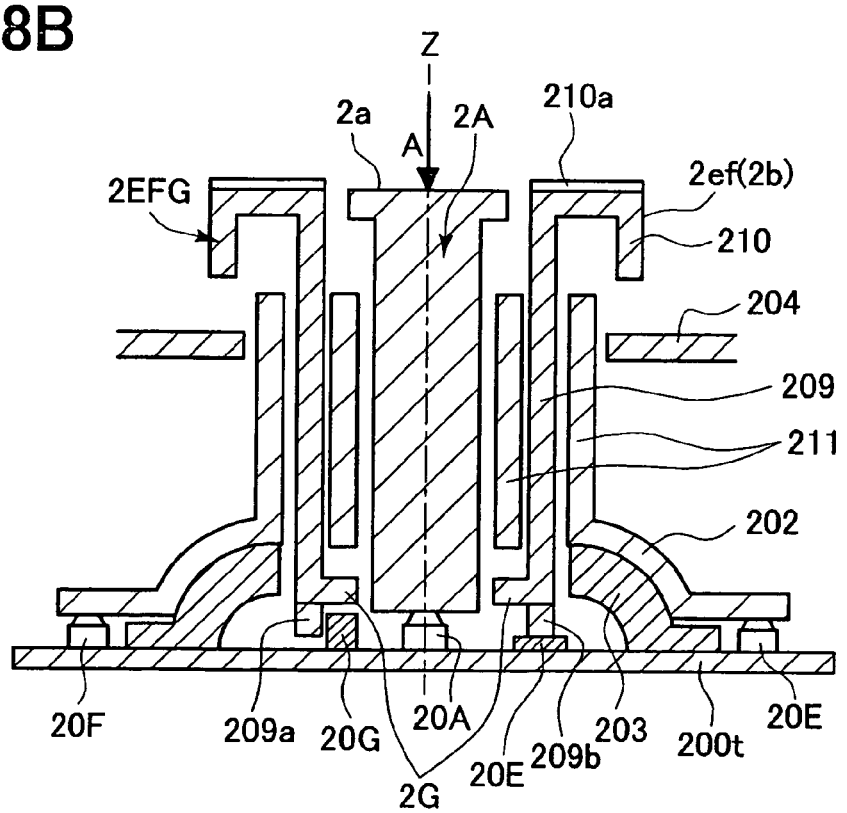
FIG. 8B is a cross-sectional view taken in a line VIIIB-VIIIB of FIG. 8A.

With reference to a manipulation device 2 in FIGS. 8A, 8B, a rotation manipulation direction of a rotation manipulation section and a press manipulation direction of a press manipulation section are orthogonal to each other. One of the above manipulation sections is defined as a manipulation section to execute a predetermined first control; the other is defined as a manipulation section to execute a second control that is made to include a denial of the first control.

FIG. 8A illustrates an external view of the manipulation device 2. FIG. 8B illustrates a cross-sectional view taken in a line of VIIIB-VIIIB in FIG. 8A. A manipulation device 2 includes a cylindrical rotation manipulation section 2EFG (herein, a dial manipulation section) and a press manipulation section 2A. The cylindrical rotation manipulation section 2EFG enables a rotation manipulation to rotate about a predetermined rotation axis Z. The press manipulation section 2A enables a press manipulation towards an extending direction (the direction of the rotation axis) of the rotation axis Z. In the cylindrical rotation manipulation section 2EFG, an upper end portion of the cylindrical wall portion 209 is turned down outward to extend downward to form an external surface 2*ef*. The external surface 2*ef* is a manipulation face 2*b* touched or held by a user executing a rotation manipulation. In contrast, the lower end portion of the cylindrical wall portion 209 is inserted into a storage section (casing section) 204 and supported rotatably such that the cylindrical wall portion 209 is sandwiched by the inside and the outside of a rotation guide section 211. In addition, a sphere section 202 is formed in a lower end portion of the rotation guide section 211. The sphere section 202 is supported slidably by an outer surface of a sphere-shaped receptacle section 203 (i.e., holder) fixed in the casing section 204; thus, the rotation manipulation section 2EFG together with the rotation guide section 211 is supported such that the manipulation shaft section 201 is able to be swung with respect to the casing section 204. That is, the rotation manipulation section 2C enables not only a rotation manipulation about the rotation axis Z but also a swing manipulation having a two-dimensional manipulation flexibility, like the joy stick type manipulation body section 9 (2C). The press manipulation section 2A is arranged inside of the cylindrical manipulation section 2EFG (inside of the rotation guide section 211); it is a cylindrical member which has a circular upper surface 2*a* as a manipulation face. The press manipulation section 2A is held so as to move upward and downward in a manner to be guided to the inner circumference surface of the rotation guide section 211.

A substrate 200*t* is fixed in the casing section 204. The substrate 200*t* is mounted with a press manipulation detection section 20A, a rotation manipulation detection section 20E, and a swing manipulation detection section 20F. The press manipulation detection section 20A detects a press manipulation. The rotation manipulation detection section 20E detects a rotation direction and a rotation amount of the rotation manipulation section 2EFG using a concavo-convex 209*b*, 209*a* arranged consecutively in the hoop direction formed in the lower end portion of the cylindrical wall portion 209 of the rotation manipulation section 2EFG. The swing manipulation detection section 20F detects a swing direction and a swing variation of the rotation manipulation section 2EFG. These manipulation detection sections 20A, 20E, 20F are connected with the control circuit 10 via the substrate 200*t*. The rotation manipulation detection section 20E can be a well-known optical sensor having a light emitting section and a light receiving section. When the cylindrical wall portion 209 rotates, the light of the emitting part transmits through a concave portion and is shut down by the concave portion. To that end, the light emitting part and the light receiving part are arranged inside and outside of the cylindrical wall portion 209, respectively. This allows the detection of the switchover of the receiving state of the light receiving part.

In the embodiment in FIGS. 8A, 8B, The press manipulation section 2A is assigned with the first manipulation section 2A to execute the predetermined first control. The rotation manipulation section 2EFG providing the rotation manipulation is assigned with the second manipulation section 2B to execute the second control made to include a denial of the first control. It is noted that the above second control may be executed by the rotation manipulation section 2EFG providing the swing manipulation. Further, the second control may be executed by one of or both of the rotation manipulation and swing manipulation.

Further, in the embodiment of FIGS. 8A, 8B, the manipulation detection section 20G may be used to detect, of the rotation manipulation section 2EFG, a pulling-up manipulation having a direction opposite the press manipulation direction A of the press manipulation section 20A. In such a case, the rotation manipulation detection section 20G can be a well-known optical sensor having a light emitting part and a light receiving part. Light of the light emitting part provided on the substrate 200*t* is reflected by a reflection face 2G facing downward; the reflection face 2G is arranged at a position the height of which is not varied even the cylindrical wall portion 209 is rotated. The reflected light is detected by the light receiving part provided in the substrate 200*t*. The light receiving part outputs the detection signal according to the luminous intensity; the control circuit 10 can determine the above pulling-up manipulation when the luminous intensity obtained from the detection signal is less than a predetermined level. In such a case, the manipulation direction, of the pulling-up manipulation of the rotation manipulation section 2EFG is opposite the press manipulation direction A of the press manipulation section 2A and orthogonal to the rotation manipulation direction or the swing manipulation direction of the rotation manipulation section E. If the rotation manipulation section E providing the rotation manipulation or swing manipulation functions as the second manipulation section 2B, the rotation manipulation section 2EFG providing the pulling-up manipulation can be regarded as the first manipulation section for executing the first control corresponding to the second control. On the contrary, if the rotation manipulation section E providing the rotation manipulation or swing manipulation functions as the first manipulation section 2A, the rotation manipulation section 2EFG providing the pulling-up manipulation can be regarded as the second manipulation section for executing the second control corresponding to the first control.

Figure 9A:
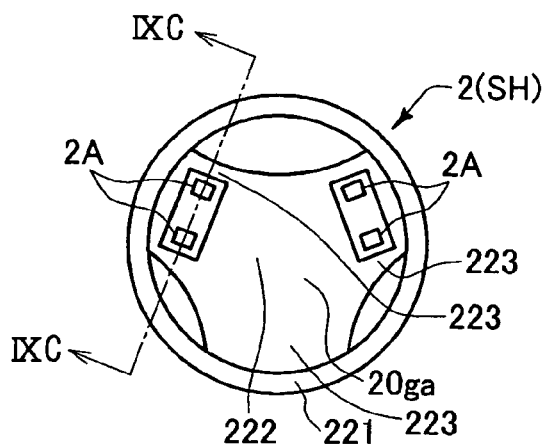
FIG. 9A is an external front view for illustrating a manipulation device of a sixth embodiment of the present invention.
Figure 9B:
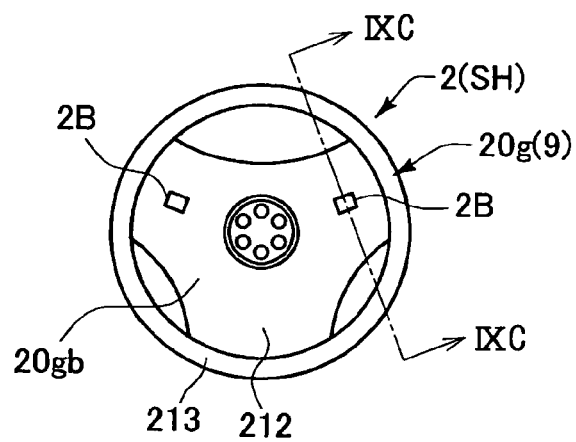
FIG. 9B is an external rear view for illustrating the manipulation device of FIG. 9A.
Figure 9C:
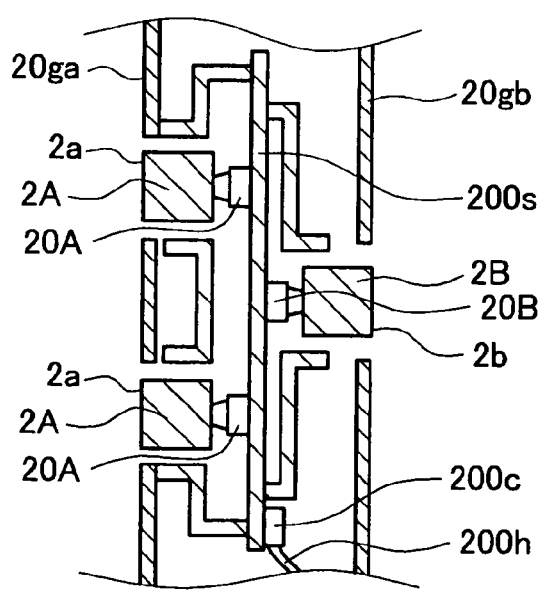
FIG. 9C is a cross-sectional view taken in a line IXB-IXB of FIGS. 9A, 9B.

A manipulation device 2 of FIGS. 9A to 9C includes a steering wheel SH of the vehicle as a manipulation body section 9. FIG. 9A is a schematic external view when the manipulation device 2 is seen from the front side. FIG. 9B is a schematic external view of the manipulation device 2 in FIG. 9A when seen from the rear side. FIG. 9C illustrates a schematic cross-sectional view taken in IXC-IXC line in FIGS. 9A, 9B. The front face 20*ga* facing a driver of the steering wheel SH is provided with a first manipulation section 2A (herein, a press manipulation section) for executing a predetermined first control. The rear face 20*gb* opposite the driver side of the steering wheel SH is provided with a second manipulation section 2B (herein, a press manipulation section) for executing the second control, which is made to include a denial of the first control. The steering wheel SH includes a ring section 221 (circular grip, section) which the driver grasps at the time of a driving manipulation, a central boss section 222, and a spoke section 223 which combines the above two sections 221, 222. The boss section 222 is incorporated with a horn mechanism and an air bag mechanism; a central region is used as a storage section of an air bag while a front face serves as a horn button or switch. Therefore, the manipulation sections 2A, 2B are provided in the spoke section 223 or in an area of the boss section 222 close to the spoke section 223. The internal space 200r accommodates a sub substrate 200s. The sub substrate 200s is mounted with the manipulation detection section 20A of the manipulation section 2A in the front face, and the manipulation detection section 20B of manipulation section 2B in the rear face. Further, the sub substrate 200s is further mounted with a connector 200c for externally outputting detection information of the manipulation detection sections 20A, 20B. The connector 200c is connected with one end of a harness 200h; the other end of the harness 200h is connected to the control circuit 10 via the main substrate (unshown).

Figure 10A:
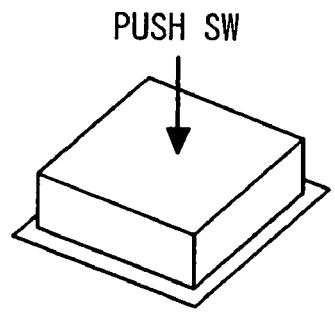
FIGS. 10A to 10D are examples of manipulation sections applicable as a first manipulation section and a second manipulation section.
Figure 10B:
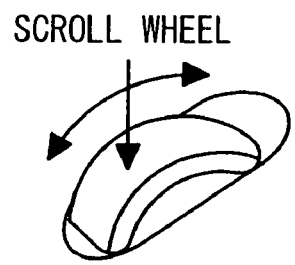
Figure 10C:
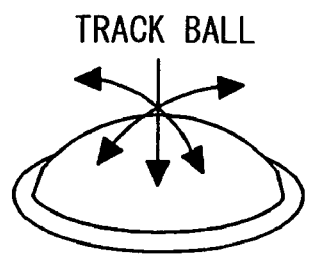

In the above embodiments, the first manipulation section 2A to execute a predetermined first control and the second manipulation section 2B to execute a predetermined second control, which is made to include a negation of the first control, are assigned to push switches (press manipulation) as illustrated in FIG. 10A. Without need to be limited thereto, the manipulation sections can be assigned to another one as follows: a scroll wheel illustrated in FIG. 10B (rotation manipulation+press manipulation), a trackball as illustrated in FIG. 10C (rotation manipulation+press manipulation), and a touch panel or touchpad (press manipulation (touch manipulation)+trace manipulation (sliding manipulation) illustrated in FIG. 10D. Each arrow in the drawings illustrates a manipulation direction of each manipulation section.

Figure 10D:
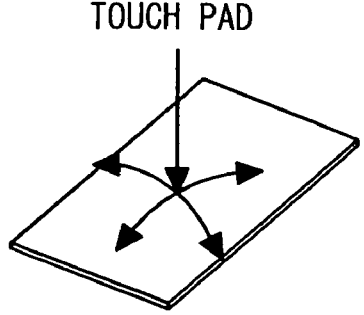
Figure 12A:
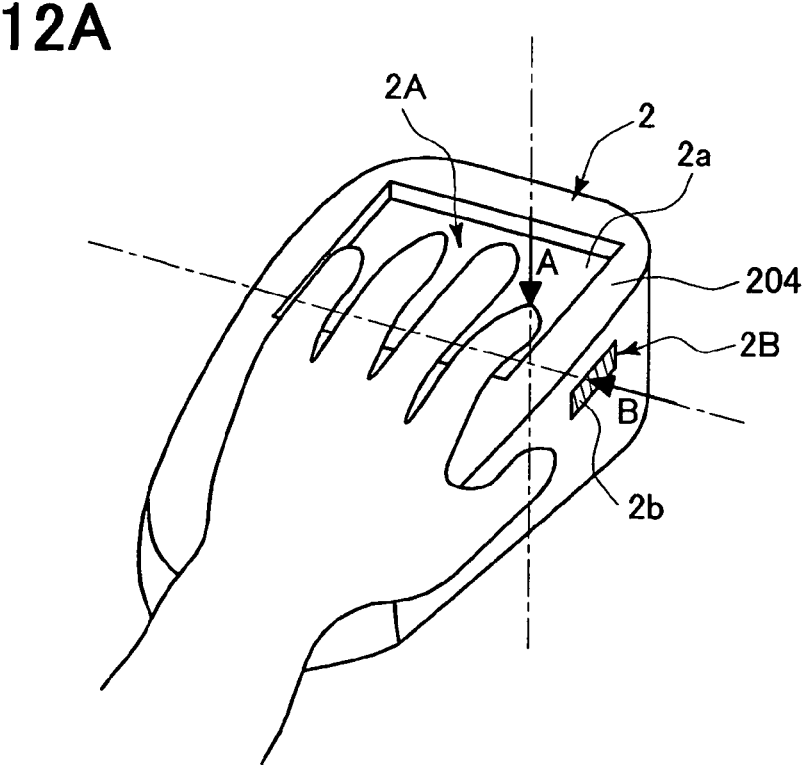
FIGS. 12A to 12C are diagrams for explaining manipulation directions in use of a touch pad for a manipulation device.
Figure 12B:
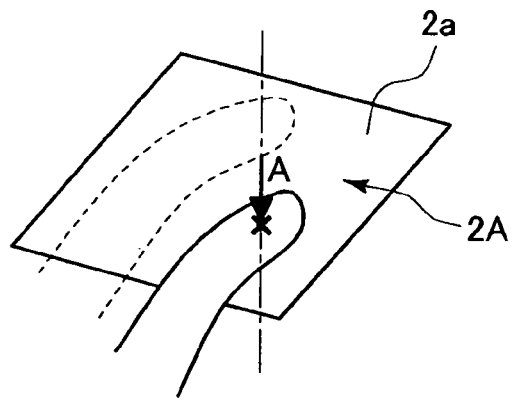
Figure 12C:
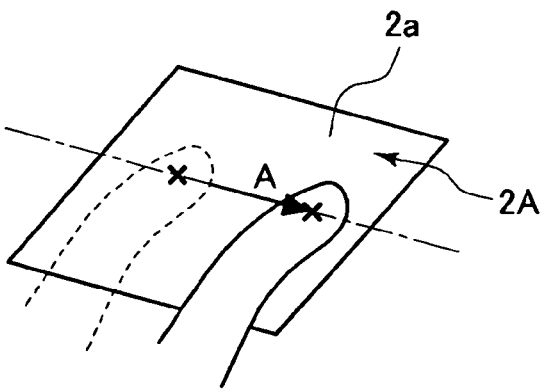

The touchpad illustrated in FIG. 10D detects a distribution of the electric capacity in the whole touch surface; the center of the distribution is detected as a touch position by using a well-known electrostatic type touchpad etc. The touchpad type manipulation device 2 is exemplified in FIG. 12A. As illustrated in FIG. 12B, the press manipulation can be detected based on the state change from a non-contact state into a contact state; further, as shown in FIG. 12C, the sliding manipulation can be also detected which the contact position is slid over the pad surface while being touched. Accordingly, the sliding manipulation can be assigned to the manipulation for executing the predetermined first control, or the second control including a denial of the first control. That is, when the manipulation direction of the sliding manipulation includes an orthogonal component or opposite component with respect to the manipulation direction of the first manipulation section 2A, the above second control may be executed.

Figure 11A:
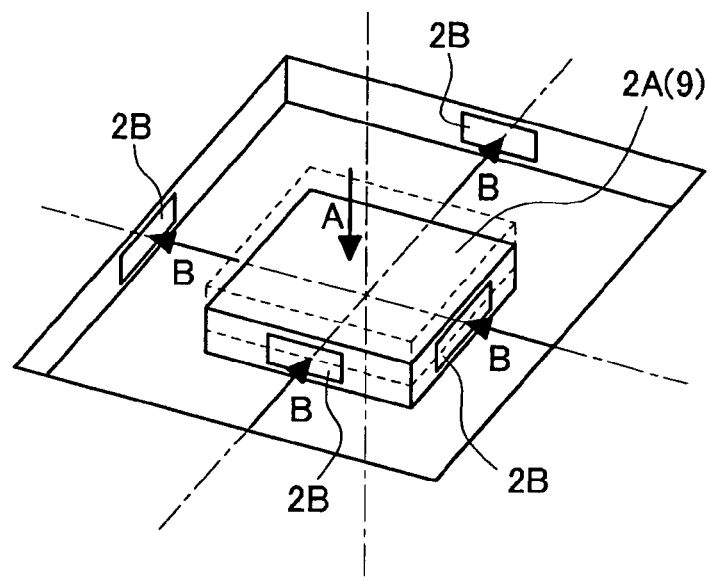
FIGS. 11A, 11B are views of an embodiment where a manipulation body section serves as a first manipulation section and a surrounding portion serves as a second manipulation section.
Figure 11B:
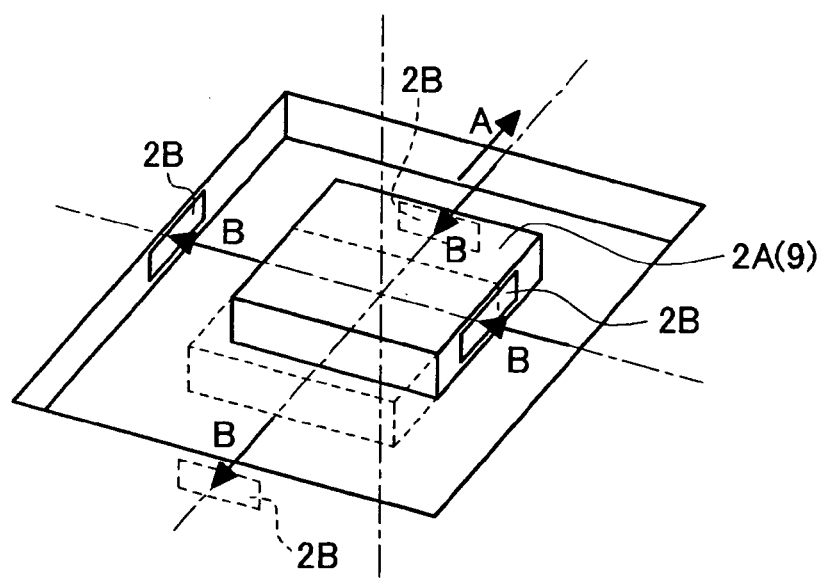

Further, another manipulation device is shown in FIGS. 11A, 11B, which are views of an embodiment where a manipulation body section serves as a first manipulation section and a surrounding portion serves as a second manipulation section. Herein, the first manipulation direction A and the second manipulation direction B are illustrated along with the first manipulation section 2A, and the second manipulation section 2B.

Figure 13:
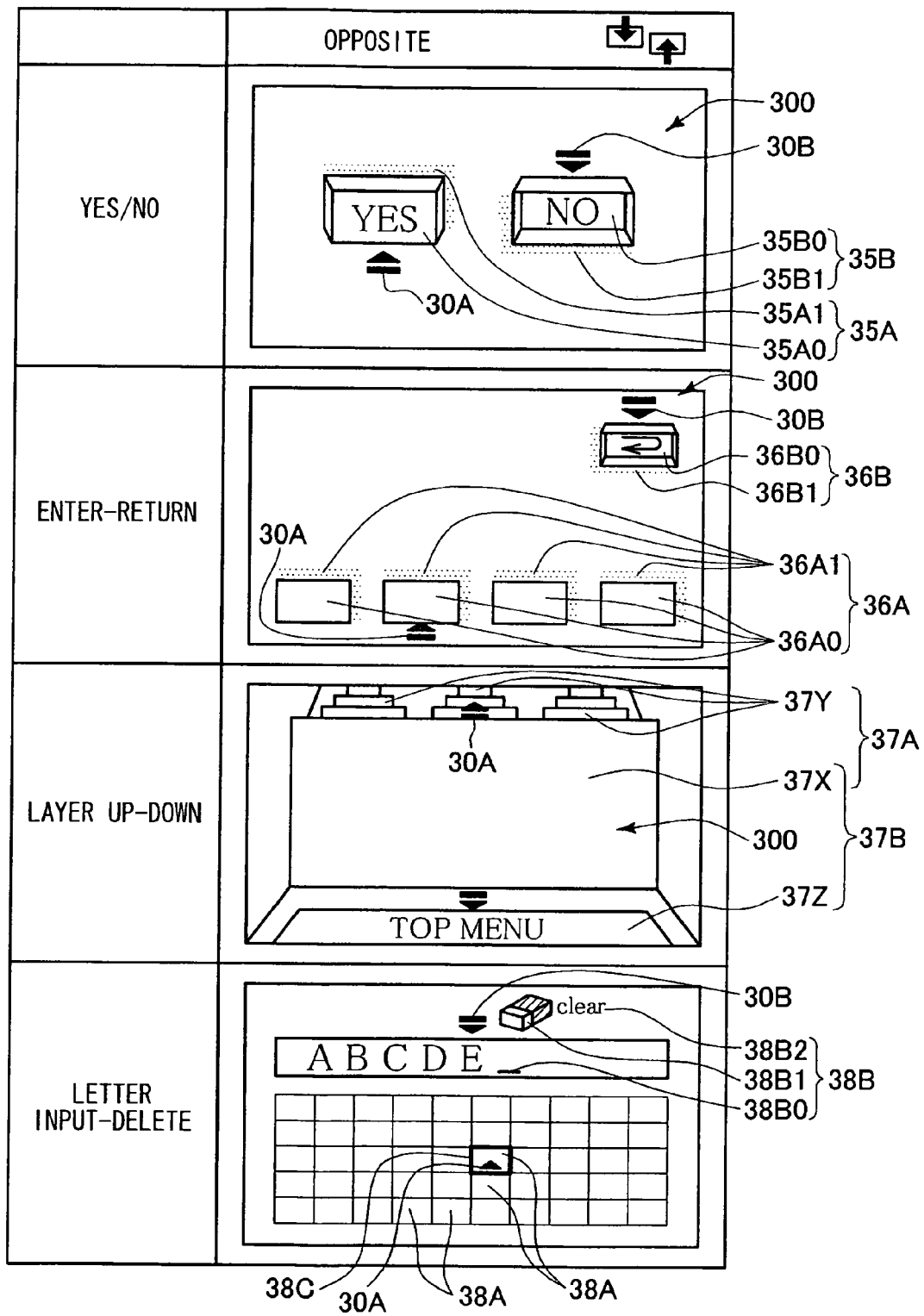
FIG. 13 is a diagram for illustrating examples of display windows different from those in FIG. 4.

In FIG. 4, the display example of the manipulation direction display window 300 is under the condition of the orthogonal relation being fulfilled between the manipulation direction in which to execute a predetermined first control and a manipulation direction in which to execute a predetermined second control, which is made to include a negation of the first control. In contrast, FIG. 13 illustrates an example of the manipulation direction display window 300 under the condition of the reverse relation being fulfilled between the manipulation direction A and the manipulation direction B. Further, the present invention is not limited to the case that the manipulation direction A and the manipulation direction B are true reverse to each other. The manipulation direction B only needs to have at least a reverse direction component b with respect to the manipulation direction A (see FIG. 2).

FIG. 13(a) illustrates a manipulation section correspondence images 35A and 35B corresponding to the first and second manipulation sections 2A, 2A, respectively, as a manipulation direction display window 300, similar to FIG. 4(a). The manipulation section correspondence images 35A, 35B are used to illustrate manipulation direction display portions 30A, 30B corresponding to the first and second manipulation sections 2A, 2B, respectively, so as to indicate mutual indication directions being orthogonal to each other. The manipulation direction display portions 30A, 30B indicate the manipulation directions A, B of the corresponding manipulation sections 2A, 2B in the vehicle compartment. The indicated direction is directed at the central part of each of the manipulation section correspondence images 35A, 35B. The manipulation section correspondence images 35A, 35B have quadrangular shapes. Each of the manipulation direction display portions 30A, 30B is a direction indication image, which is orthogonal to one of four sides of the manipulation section correspondence image 35A, 35B and points out a central part from the outside of the manipulation selection correspondence image 35A, 35B. In addition, the manipulation section correspondence images 35A, 35B are drawn to be viewed as three dimensions (stereographic) and accompanied by the manipulation direction display portions 30A, 30B indicating the manipulation directions A, B of the corresponding manipulation sections 2A, 2B, respectively. Further, the manipulation section correspondence images 35A, 35B include stereographic button images 35A0, 35B0 which expresses a depth and shadow portions 35A1, 35B1 for expressing stereographic shape more clearly. Expression using light and shadow can highlight the stereoscopic effect relative to the manipulation section correspondence images 35A, 35B.

Like in FIG. 4(b), the manipulation direction display window 300 in FIG. 13(b) contains several first input images 36A to execute the first control when a manipulation input is made by the first manipulation section 2A. FIG. 13(b) further displays a first manipulation direction display portion 30A by using the first input image 36A, a second input image 36B to execute the second control against the first control according to a manipulation input by the second manipulation section 2B, and a second manipulation direction display portion 30B by using the second input image 36B. The input images 36A, 36B and the manipulation direction display portions 30A, 30B are displayed like FIG. 13(a).

The manipulation direction display window 300 in FIG. 13(c), like FIG. 4(c), displays the following: a control content image 37A allowing the estimation or recognition of a control content of the first control; a first manipulation direction display portion 30A by using the first input image 37A; a second control content image 37B allowing the estimation or recognition of the control content of the second control against the first control; and a second manipulation direction display portion 30B by using the second control content image 37B.

It is noted that the first control in FIG. 13(c) is a switchover control to switch the first display image 33X, which is presently displayed as a main display, to a second display image 37Y which is lower layered compared with the first display image 37X, like in FIG. 4(c). The first and second display images 37X, 37Y belong to a display image group having multi-layered structure in which display of each display image of the display image group is switchable in a hierarchical order. The second control content image 37A illustrates that the display image 37B exists as a lower layered display image with respect to the first display image 37X presently displayed as a main display; further, it illustrates that the display image 37B is displayable. The first control content image 37A in FIG. 13(c) expresses the image 37y, which corresponds to the second display image 37Y that serves as the lower layered display image, such that the image 37y is disposed behind the first display image 37X that is presently displayed as a main display in the manipulation direction display window 300.

In FIG. 13(c), several second display images 33Y, into which the first display image 33X is switched, are contained; thus, several first control content images 33A are also contained (herein, three images). Those first control content images 33A are input images selectable by a selection manipulation. The first manipulation direction display portion 30A is displayed with respect to the first control content image (input image) 37A, which is being under the selection state by the selection manipulation. At this time, the first manipulation direction display portion 30A may function as a cursor pointing out the first control content image 37A under the selection state.

It is noted that the second control in FIG. 13(c) is a switchover control to switch the first display image 37X, which is presently displayed as a main display, to a higher layered display image which is positioned in the hierarchy side opposite the second display image 37Y. The first display image 37X and the higher layered display image belong to a display image group having a multi-layered hierarchical structure in which display of each display image of the display image group is switchable in a hierarchical order. The second control content image 37B illustrates that the display image 37Z exists as a higher layered display image with respect to the first display image 37X presently displayed as a main display; further, it illustrates that the second image 37Z is displayable. In the first control content image 37A in FIG. 13(c), the image 37Z corresponding to the third display image 37Z (the uppermost layered display image) that serves as a higher layer image is expressed to appear in front of the first display image 37X presently displayed mainly. It is noted that the image 37Z does not need to be the third display image itself, but the image 37Z only needs to be an image that enables the estimation or recognition that the image 37Z be higher than the first display image 37X in the hierarchy order.

Several third display images 37Z can be provided which are switchable from the first display image 37X. In this case, the several third control content images 37B are also provided. Those second control content images 37B are input images selectable by a selection manipulation. The second manipulation direction display portion 30B is displayed with respect to the third control content image (input image) 37B under the selection state by the selection manipulation. The third manipulation direction display portion 30B may function as a cursor pointing out the third control content image 37B under the selection state.

FIG. 13(d) shows a letter symbol input window as a manipulation direction display window 300, like that in FIG. 4(d). Several first input images 38A are displayed in arrangement to execute the first control (letter symbol input) according to a manipulation input using the first manipulation section 2A. A first manipulation direction display portion 30A is displayed by using the first input image 38A. The second control content image 38B is displayed which allows the estimation or recognition of a control content of the second control (letter symbol eraser), which is executed according to a manipulation input by the second manipulation section 2B. Herein, the second control is relative to the first control, which is executed just before. FIG. 13(d) further displays a second manipulation direction display portion 30B by using the second control content image 38B; however, the position and indication direction of the manipulation direction display portion 30B differ. The second control content image 38B in FIG. 13(d) contains, similar to FIG. 4(d), the following: a prompt 38B0 displayed in the input letter symbol string display portion 38Y; an image 38B1 (herein, eraser image), which is close to the prompt 38B0 and images a letter symbol eraser; and a letter symbol string 38B2 (herein, a letter string "clear"), which is close to the prompt 38B0 and imaging the letter symbol eraser. The second manipulation direction display portion 30B is displayed to point out an inputted character which adjoins the prompt of an eraser target in a manner to indicate the manipulation direction B of the second manipulation section 2B.

In FIG. 4, the manipulation section correspondence images 35A, 35B may be displayed so as to be associated with the actual shape of the manipulation sections 2A, 2B or to express a real shape of the manipulation sections 2A, 2B. This can indicate the correspondence relation between the manipulation section correspondence images 35A, 35B and the manipulation sections 2A, 2B, more clearly.

In addition, in FIG. 4(c) and FIG. 12(c), a switchover control may be provided as the second control to switch a display image from the presently displayed image into the just previously displayed image.

It is noted that in the present embodiment, the positional or directional relation of the first manipulation direction A and the second manipulation direction B is designated as being orthogonal or reverse (or opposite). Such a positional relation means as follows. The start positions of both manipulation directions are made identical. Two line segments are defined as extending from the identical start position towards the manipulation directions. Being orthogonal means that an angle formed by the two line segments is 90 degrees; being opposite means that an angle formed by the two line segments is 180 degrees. That is, suppose an X-Y axis coordinates plane of two axes orthogonal to each other. When one manipulation direction is assigned to one axis (e.g., −Y), a vector of the other manipulation direction is orthogonal (e.g., −X) or opposite (e.g., +Y). However, a predetermined amount of error may be allowed in respect of being orthogonal or opposite. For instance, being orthogonal can include an error range such that 90 degrees+−22.5 degrees; being opposite can include an error range such that 180+−45 degrees. More desirably, being orthogonal can include an error range such that 90+−5 degrees (much more desirably +−3 degrees); being opposite can include an error range such that 180+−10 degrees (much more desirably +−5 degrees).

Aspects of the disclosure described herein are set out in the following clauses.

As an aspect of the disclosure, a vehicular manipulation input apparatus in a vehicle is provided as follows. A first manipulation section is configured to execute a first control, the first manipulation section having a first manipulation direction. A second manipulation section is configured to execute a second control that is made to include a denial of the first control, the second manipulation section having a second manipulation direction. Herein, the first manipulation section and the second manipulation section are arranged (i) such that the second manipulation direction of the second manipulation section is orthogonal to the first manipulation direction of the first manipulation section, or (ii) such that the second manipulation direction of the second manipulation section has a directional component, which is opposite the first manipulation direction of the first manipulation section.

As an optional aspect, the first manipulation section and the second manipulation section may be arranged in a pair at mutually different positions, respectively.

According to the above configuration, the first manipulation section and the second manipulation section are arranged at positions different from each other. This can reduce a possibility of manipulating incorrectly an unintended manipulation section. Further, the manipulation directions of the first manipulation section and the second manipulation section differ from each other; this can eliminate a possibility of manipulating incorrectly an unintended manipulation section.

The second control, which is made to negate the first control, is defined to include a control of suspension, release, or nullification of the first control, a control to return to a control state prior to the execution of the first control. The configuration. Where one manipulation direction is orthogonal to the other manipulation direction, signifies as follows. The start positions of both manipulation directions are moved to an identical start point; two straight lines are drawn along the two manipulation directions from the identical start point; an angle formed by the two straight lines is 90 degrees. That is, on a plane of two direction components or axes of X-Y coordinates, when one manipulation direction is assigned to one axis (e.g., −Y), a vector of the other manipulation direction is orthogonal (e.g., −X). It is noted that some errors can be permitted as mentioned later.

As an optional aspect, a second directional extension line is defined as a normal line or an orthogonal line extending from a manipulation face which a user touches in order to manipulate the second manipulation section in the second manipulation direction; and a first directional extension line is defined as a normal line or an orthogonal line extending from a manipulation face which the user touches in order to manipulate the first manipulation section in the first manipulation direction. Herein, the first manipulation section and the second manipulation section may be arranged (i) such that the first directional extension line relative to the first manipulation section and the second directional extension line relative to the second manipulation section are orthogonal to each other, or (ii) such that an extending direction of the second directional extension line relative to the second manipulation section has a directional component that is opposite an extending direction of the first directional extension line relative to the first manipulation section.

According to the above configuration, the first manipulation section and second manipulation section are provided independently, and the corresponding manipulation faces touched by a user are arranged to have directions different from each other; thus, the mis-manipulation in the respective manipulation sections can be prevented certainly. The first and second manipulation sections can be arranged such that two first and second directional extension lines cross each other in either manner (i) that the first directional extension line and the second directional extension line are orthogonal to each other, or (ii) that the first directional extension line and the second directional extension line have respective directional components opposite each other. Thus, the mis-manipulation in the respective manipulation sections can be prevented more certainly.

In detail, first, a second normal line or perpendicular line is defined as being a line extending from a part of a manipulation face (e.g., a central part or a gravity center), which the user touches in order to manipulate the second manipulation section, to the second manipulation direction; a first normal line or perpendicular line is defined as being a line extending from a part of a manipulation face (e.g., a central part or a gravity center), which the user touches in order to manipulate the first manipulation section; to the first manipulation direction. When the above two normal lines are orthogonal to each other or, opposite each other, the difference between the two manipulation sections can be easily recognized much clearly. Further, the configuration where one manipulation direction and the other manipulation direction are perpendicular to each other or opposite each other signifies as follows. The start positions of both manipulation directions are moved to an identical start point; two straight lines are drawn along the two respective manipulation directions from the identical start point; an angle formed by the two respective straight lines is 90 degrees or 180 degrees, respectively. That is, on a plane of two direction components or axes of X-Y coordinates, when one manipulation direction is assigned to one axis (e.g., −Y), a vector of the other manipulation direction is orthogonal (e.g., −X) or opposite (e.g., +Y). It is noted that a predetermined amount of error may be allowed in respect of being orthogonal or opposite. An allowable range of being orthogonal may be 90 degrees±22.5 degrees; it is more desirably 90 degrees±5 degrees. An allowable range of being opposite may be 180 degrees±45 degrees; it is more desirably 180±10 degrees.

As an optional aspect, both the first manipulation section and the second manipulation section may be provided to be contained in a single manipulation body section which a user manipulates.

Although having only a limited space, the single manipulation body section arranges or accommodates both the first and second manipulation sections such that the manipulation directions and the directions of the manipulation faces are differentiated from each other; thus, the respective manipulation sections can be recognized more clearly. The mis-manipulation in the respective manipulation sections can be prevented certainly.

As an optional aspect, the manipulation body section may serve as a third manipulation section allowing a manipulation having a third manipulation direction different from the first manipulation direction of the first manipulation section and the second manipulation direction of the second manipulation section.

This can achieve the manipulation input apparatus enabling at least three different manipulations. In such a configuration, the manipulation of the third manipulation section may enable a selection manipulation for selecting a first control out of several controls; the manipulation of the first manipulation section may enable an affirmative manipulation for executing the first control selected by the selection manipulation of the third manipulation section; and the manipulation of the second manipulation section may enable a negative manipulation for executing a second control including a negation or denial of the first control of the first manipulation section.

As an optional aspect, the vehicular manipulation input apparatus may further include a display device and a manipulation direction displaying section. The manipulation direction displaying section may be configured to display, on a display screen of the display device, a manipulation direction window which illustrates one of or both of (i) a first manipulation direction display portion that displays the first manipulation direction of the first manipulation section in a compartment of the vehicle and (ii) a second manipulation direction display portion that displays the second manipulation direction of the second manipulation section in the compartment of the vehicle.

Thus, the two manipulation directions of the first and second manipulation sections are displayed in the display window, respectively. The mis-manipulation in the respective manipulation sections can be prevented certainly.

As an optional aspect, the manipulation direction displaying section may display the manipulation direction display portion in the manipulation direction window as a direction indication image indicating a corresponding manipulation direction.

Thus, the manipulation directions are more clearly illustrated as a direction indication image such as an arrow image on the display window. The mis-manipulation in the respective manipulation sections can be prevented certainly.

As an optional aspect, the manipulation direction displaying section may display, in the manipulation direction display window, (i) a first input image to enable an execution of the first control when a manipulation input is made by the first manipulation section, and (ii) the first manipulation direction display portion by using the first input image.

The manipulation direction of the manipulation section for executing the manipulation input to the input image can be displayed by using the input image like a button icon displayed on the display window. For example, the manipulation direction display portion which illustrates the manipulation direction of the manipulation section for executing the manipulation input to the input image can be displayed in a manner of going to the central part of the input image.

As an optional aspect, a third manipulation section may be further included. Herein, the manipulation direction displaying section may display, in the manipulation direction display window, a plurality of first input images, one of which is selected as being under a selection state by a section manipulation applied to the third manipulation section; and when a selection state is switched between the input images and newly assigned to a new input image by a selection manipulation applied to the third manipulation section, the manipulation direction displaying section may move a display position of the first manipulation direction display portion to a display position which indicates the new input image newly assigned with the selection state.

When the display is made for several input images like an input window for letters and symbols such as 50 Japanese characters, alphabetic characters, numerals, and signs, the manipulation direction display portion can be illustrated by using the input image under the selection state. The manipulation direction for carrying out the manipulation input to the input image under the selection state can be understood easily.

As an optional aspect, the manipulation direction displaying section may display, in the manipulation direction window, (i) a second input image along with the first input images, the second input image enabling an execution of the second control, which is relative to the first control just previously made, when a manipulation input is made by the second manipulation section, and (ii) the second manipulation direction display portion by using the second input image. Further, when the second input image is selected by a selection manipulation applied to the third manipulation section, the manipulation direction displaying section may display simultaneously both the first manipulation direction display portion and the second manipulation direction display portion.

This can enable an easy understanding that with respect to the second input image under the selection state, either the first manipulation section or the second manipulation section can execute a manipulation input.

The third manipulation section can be a manipulation section different from both the first and second manipulation sections while enabling a manipulation input independently of those of the first and second manipulation sections. This can help prevent the confoundedness of the third manipulation section with the first and the second manipulation sections. In detail, the third manipulation section can be achieved by the manipulation body section itself as mentioned above. Thereby, the function of the first to third manipulation sections can be achieved by the single manipulation body section.

As an optional aspect, the manipulation direction displaying section may display, in the manipulation direction window, (i) a second input image along with the first input images, the second input image enabling an execution of the second control, which is relative to the first control just previously made, when a manipulation input is made by the second manipulation section, and (ii) the second manipulation direction display portion by using the second input image.

The manipulation direction of the manipulation section for executing the manipulation input to the input image can be displayed by using the input image like a button icon displayed on the display window. For example, the manipulation direction display portion which illustrates the manipulation direction of the manipulation section for executing the manipulation input to the input image can be displayed in a manner of going to the central part of the input image.

As an optional aspect, the input image may be displayed in one to one correspondence with the manipulation section as a manipulation section image that suggests a three-dimensional shape of the manipulation section.

The correspondence relation between the actual manipulation section and the input image on the display becomes clear; this can help prevent the mis-manipulation from arising.

As an optional aspect, the manipulation direction displaying section may display, in the manipulation display window, (i) a first control content image enabling estimation or recognition of a control content of the first control, and (ii) the first manipulation direction display portion by using the first control content image.

This can achieve a clear display of the manipulation direction of the manipulation section for executing the control content which is intended, and can help prevent the mis-manipulation.

As an optional aspect, the manipulation direction displaying section may display, in the manipulation display window, (i) a second control content image enabling estimation or recognition of a control content of the second control, and (ii) the second manipulation direction display portion by using the second control content image.

This can achieve a clear display of the manipulation direction of the manipulation section for executing the control content which is intended, and can help prevent the mis-manipulation.

As an optional aspect, the control content may include a main display switchover control which changes a main display in the manipulation direction display window from a first display image to a second display image. The control content image of the main display switchover control may contain (i) the first display image displayed as, the main display in the manipulation direction display window, and (ii) a display image corresponding to the second display image. The manipulation direction display portion corresponding to the main display switchover control may be displayed such that the direction indication image indicating the manipulation direction of the manipulation section for executing the main display switchover control is illustrated to point out from the first display image towards the display image corresponding to the second display image.

This can achieve a clear display illustrating a display content switchover indicating switchover from a present display content to a new display content and a manipulation direction of the manipulation section. This can help prevent the mis-manipulation.

As an optional aspect, the manipulation direction displaying section may display, in the manipulation direction display window, (i) a manipulation selection correspondence image corresponding to the manipulation section, and (ii) the manipulation direction display portion by using the manipulation selection correspondence image.

In such a case, the display window illustrates a manipulation section image corresponding to either the first manipulation section or the second manipulation section. The manipulation direction of the corresponding manipulation section is displayed using the manipulation section image. This can help prevent the mis-manipulation.

As an optional aspect, the manipulation section correspondence image may be displayed as a manipulation section image suggesting a three-dimensional shape of the corresponding manipulation section.

The correspondence relation between the actual manipulation section and the manipulation section correspondence image on the display becomes clear; this can help prevent the mis-manipulation from arising.

It will be obvious to those skilled in the art that various changes may be made in the above-described embodiments of the present invention. However, the scope of the present invention should be determined by the following claims.

What is claimed:

1. A vehicular manipulation input apparatus in a vehicle, the apparatus comprising:
    a first manipulation section configured to execute a first control, the first manipulation section having a first manipulation direction; and
    a second manipulation section configured to execute a second control that is made to include a denial of the first control, the second manipulation section having a second manipulation direction,
    the first manipulation section and the second manipulation section being arranged
        (i) such that the second manipulation direction of the second manipulation section is orthogonal to the first manipulation direction of the first manipulation section, or
        (ii) such that the second manipulation direction of the second manipulation section has a directional component, which is opposite the first manipulation direction of the first manipulation section; wherein
        the first manipulation section and the second manipulation section are arranged in a pair at mutually different positions, respectively;
    a second directional extension line is defined as a normal line or an orthogonal line extending from a manipulation face, which a user touches in order to manipulate the second manipulation section, towards the second manipulation direction;
    a first directional extension line is defined as a normal line or an orthogonal line extending from a manipulation face, which the user touches in order to manipulate the first manipulation section, towards the first manipulation direction; and
    the first manipulation section and the second manipulation section are arranged
        (i) such that the first directional extension line relative to the first manipulation section and the second directional extension line relative to the second manipulation section are orthogonal to each other, or
        (ii) such that an extending direction of the second directional extension line relative to the second manipulation section has a directional component that is opposite an extending direction of the first directional extension line relative to the first manipulation section.

2. The vehicular manipulation input apparatus according to claim 1, wherein
    the first directional extension line relative to the first manipulation section and the second directional extension line relative to the second manipulation section are orthogonal to each other.

3. The vehicular manipulation input apparatus according to claim 1, wherein
    the first directional extension line relative to the first manipulation section and the second directional extension line relative to the second manipulation section are parallel with each other and opposite each other.

4. The vehicular manipulation input apparatus according to claim 1, wherein
    the first manipulation section and the second manipulation section are accommodated in a single manipulation body section.

5. The vehicular manipulation input apparatus according to claim 4, wherein
    the manipulation body section serves as a third manipulation section allowing a manipulation having a third manipulation direction different from the first manipulation direction of the first manipulation section and the second manipulation direction of the second manipulation section.

6. The vehicular manipulation input apparatus according to claim 1, further comprising:
    a display device; and
    a manipulation direction displaying section configured to display, on a display screen of the display device, a manipulation direction window which illustrates one of or both of
        (i) a first manipulation direction display portion that displays the first manipulation direction of the first manipulation section in a compartment of the vehicle and
        (ii) a second manipulation direction display portion that displays the second manipulation direction of the second manipulation section in the compartment of the vehicle.

7. The vehicular manipulation input apparatus according to claim 6, wherein
    the manipulation direction displaying section displays the manipulation direction display portion in the manipulation direction window as a direction indication image indicating a corresponding manipulation direction.

8. The vehicular manipulation input apparatus according to claim 6, wherein
    the manipulation direction displaying section displays, in the manipulation direction display window,
        (i) a first input image to enable an execution of the first control when a manipulation input is made by the first manipulation section, and
        (ii) the first manipulation direction display portion by using the first input image.

9. The vehicular manipulation input apparatus according to claim 8, further comprising:
a third manipulation section,
wherein:
the manipulation direction displaying section displays, in the manipulation direction display window, a plurality of first input images, one of which is selected as being under a selection state by a section manipulation applied to the third manipulation section; and
when a selection state is switched between the input images and newly assigned to a new input image by a selection manipulation applied to the third manipulation section, the manipulation direction displaying section moves a display position of the first manipulation direction display portion to a display position which indicates the new input image newly assigned with the selection state.

10. The vehicular manipulation input apparatus according to claim 9, wherein:
the manipulation direction displaying section displays in the manipulation direction window
(i) a second input image along with the first input images, the second input image enabling an execution of the second control, which is relative to the first control just previously made, when a manipulation input is made by the second manipulation section, and
(ii) the second manipulation direction display portion by using the second input image; and
when the second input image is selected by a selection manipulation applied to the third manipulation section, the manipulation direction displaying section displays simultaneously both the first manipulation direction display portion and the second manipulation direction display portion.

11. The vehicular manipulation input apparatus according to claim 6, wherein the manipulation direction displaying section displays, in the manipulation direction window,
(i) a second input image along with the first input images, the second input image enabling an execution of the second control, which is relative to the first control just previously made, when a manipulation input is made by the second manipulation section, and
(ii) the second manipulation direction display portion by using the second input image.

12. The vehicular manipulation input apparatus according to claim 8, wherein
the input image is displayed in one to one correspondence with the manipulation section as a manipulation section image that suggests a three-dimensional shape of the manipulation section.

13. The vehicular manipulation input apparatus according to claim 6, wherein
the manipulation direction displaying section displays, in the manipulation display window,
(i) a first control content image enabling estimation or recognition of a control content of the first control, and
(ii) the first manipulation direction display portion by using the first control content image.

14. The vehicular manipulation input apparatus according to claim 6, wherein
the manipulation direction displaying section displays, in the manipulation display window,
(i) a second control content image enabling estimation or recognition of a control content of the second control, and
(ii) the second manipulation direction display portion by using the second control content image.

15. The vehicular manipulation input apparatus according to claim 13, wherein:
the control content includes a main display switchover control which changes a main display in the manipulation direction display window from a first display image to a second display image;
the control content image of the main display switchover control contains
(i) the first display image displayed as the main display in the manipulation direction display window, and
(ii) a display image corresponding to the second display image; and
the manipulation direction display portion corresponding to the main display switchover control is displayed such that the direction indication image indicating the manipulation direction of the manipulation section for executing the main display switchover control is illustrated to point out from the first display image towards the display image corresponding to the second display image.

16. The vehicular manipulation input apparatus according to claim 6, wherein
the manipulation direction displaying section displays in the manipulation direction display window
(i) a manipulation selection correspondence image corresponding to the manipulation section, and
(ii) the manipulation direction display portion by using the manipulation selection correspondence image.

17. The vehicular manipulation input apparatus according to claim 16, wherein
the manipulation section correspondence image is displayed as a manipulation section image suggesting a three-dimensional shape of the corresponding manipulation section.

* * * * *